United States Patent
Sugihara et al.

(10) Patent No.: US 6,727,304 B2
(45) Date of Patent: Apr. 27, 2004

(54) METAL-CONTAINING MONOMER DISSOLVED MIXTURE, METAL-CONTAINING RESIN AND ANTIFOULING PAINT COMPOSITION

(75) Inventors: Mitsunori Sugihara, Nagoya (JP); Yukihiro Ikegami, Nagoya (JP); Kazuhiko Hotta, Nagoya (JP); Toshio Nagasaka, Otake (JP); Kunio Iwase, Nagoya (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 265 days.

(21) Appl. No.: 09/886,111

(22) Filed: Jun. 22, 2001

(65) Prior Publication Data

US 2002/0019457 A1 Feb. 14, 2002

(30) Foreign Application Priority Data

Jun. 28, 2000 (JP) .......... 2000-194583
Jun. 28, 2000 (JP) .......... 2000-194584
Dec. 26, 2000 (JP) .......... 2000-394367

(51) Int. Cl.[7] .......... C08K 5/36; C08K 3/10; C08K 3/18
(52) U.S. Cl. .......... 524/392; 524/413; 524/431; 523/122; 252/182.14
(58) Field of Search .......... 524/392, 413, 524/431; 523/122; 252/182.14

(56) References Cited

U.S. PATENT DOCUMENTS 3,405,106 A   10/1968   Scanley .......... 260/80
4,301,266 A   11/1981   Muenster et al. .......... 526/212
4,774,080 A    9/1988   Yamamori et al. .......... 424/78
4,835,231 A    5/1989   Yamamori et al. .......... 526/240
5,080,892 A    1/1992   Yamamori et al. .......... 424/78.09

FOREIGN PATENT DOCUMENTS

| EP | 0 002 771 A1 | 7/1979 |
| EP | 0 183 466 A2 | 6/1986 |
| GB | 1 497 683 A | 1/1978 |
| GB | 2 195 122 A | 3/1988 |
| JP | 51-124130 | 10/1976 |
| JP | 62-57464 A | 3/1987 |
| JP | 62-84168 A | 4/1987 |
| JP | 63-56510 A | 3/1988 |
| JP | 5-171066 A | 7/1993 |
| JP | 09-286933 | 4/1997 |

*Primary Examiner*—Kriellion A. Sanders
(74) *Attorney, Agent, or Firm*—Morgan, Lewis & Bockius LLP

(57) ABSTRACT

A metal-containing monomer dissolved mixture comprising a reaction product of an inorganic metal compound with a carboxyl group-containing radical polymerizable monomer, an organic solvent including at least an alcohol-based solvent, and water, wherein the water content is from 0.01 to 30% by weight; a metal-containing resin obtained by copolymerizing the metal-containing monomer (A) in this dissolved mixture with the other radical-polymerizable unsaturated monomer (B); an antifouling paint composition obtained by using this metal-containing resin; and an antifouling paint composition comprising a divalent metal-containing resin (C), a compound (D) of $R^1$—SH (wherein, $R^1$ represents an organic group having 1 to 30 carbon atoms.), and copper oxide (E), are disclosed.

14 Claims, No Drawings

METAL-CONTAINING MONOMER DISSOLVED MIXTURE, METAL-CONTAINING RESIN AND ANTIFOULING PAINT COMPOSITION

BACKGROUND OF THE INVENTION

1. Field of the Invention

The present invention relates to a metal-containing monomer dissolved mixture, a metal-containing resin and an antifouling paint composition. More particularly, the present invention relates to a metal-containing monomer dissolved mixture which is soluble in a general organic solvent, excellent in storage stability and can be mixed with a general acrylic monomer and the like; a metal-containing resin soluble in a general organic solvent obtained by using the metal-containing monomer dissolved mixture as a raw material; and antifouling paint composition manifesting antifouling effect in sea for a long period of time.

2. Description of the Prior Art

Metal-containing monomers have been conventionally investigated to be used as an additive into an aqueous paint, aqueous ink, ultraviolet ray-curing material and the like, and usually, handled in the form of a powder or aqueous solution. In the case of a powder, it can be used as a modifier and the like for generally used resins such as an acrylic resin, epoxy resin, urethane resin, polyester resin and the like, and in the case of an aqueous solution, it can be used as a cross-linking agent and the like for a water-soluble resin and emulsion resin.

Metal-containing resins can be applied to various uses, and among them, use as a resin for an antifouling paint utilizing hydrolysis property thereof is expected.

An antifouling paint is painted, for example, on parts of ships and marine structures immersed in water for the purpose of preventing corrosion due to adhesion of marine organisms such as barnacle, teredo, algae and the like and reduction in navigating speed of a ship. Further, the same antifouling paint is painted also on a fish farming net for the purpose of preventing death of fishes due to adhesion of marine organisms.

A painted film formed of such an antifouling paint manifests an antifouling effect, for example, by elution of a rosin-based compound and antifouling component contained in the film into sea. However, when this painted film is immersed in sea for a long period of time, the proportion of an elution component decreases gradually to increase the proportion of non-eluting components, simultaneously the surface of the painted film becomes uneven, consequently, there is a tendency of significant reduction in an effect of preventing adhesion of organisms such as marine organisms and the like.

An organotin-based paint is conventionally used as an antifouling paint. This organotin-based antifouling paint is characteristic in that a painted film formed is gradually solved from the surface of the film to renew the surface, and an antifouling component is constantly exposed on the surface of the film (self polishing), consequently, an antifouling effect is manifested for a long period of time.

However, there is an afraid that an organotin-based antifouling paint exerts a reverse influence on fishes due to strong toxicity of organotin. Therefore, paints containing no organotin are on investigation. For example, an antifouling paint using an organosilicon-containing resin in which an organosilicon ester is introduced in a side chain, and antifouling paints using resins containing other metals than tin, have been suggested. Among others, antifouling paints using resins containing other metals than tin are noticed from the standpoints of an antifouling effect, cost and the like. For example, JP-A No. 63-56510 describes that a disintegrating type vinyl resin particle obtained by polymerizing a metal ester type polyfunctional polymerizable monomer can be added in an antifouling paint.

However, a painted film containing such a disintegrating type vinyl resin particle has problem that when immersed in sea for a long period, the surface of the film becomes uneven, and an antifouling ability thereof decreases significantly. For solving this problem, it is necessary that the metal-containing resin functions as a vehicle component of an antifouling paint, however, since a particle of such a metal-containing resin is scarcely soluble in a general solvent, use as a vehicle component is difficult. Namely, a metal-containing resin soluble in general solvent has been desired as a resin for an antifouling paint.

For example, JP-B No. 61-3830 suggests a metal-containing resin obtained by ion-changing a high acid value polymer or copolymer having a carboxyl group with a metal salt solution, and causing precipitation of a resin with an aqueous medium. Further, JP-A No. 5-171066 suggests an antifouling paint composition using as a vehicle component a copolymer constituted of a monomer having two or three double bonds and containing a metal. Further, JP-A Nos. 62-57464 and 62-84168 suggest self polishing type antifouling paint compositions using a copolymer having a specific divalent metal-containing group at the end of a side chain.

Most of metal-containing monomers typified by metal salts of polymerizable unsaturated organic acids are solid powders under normal temperature and normal pressure, and easily dissolved in water, however, are not easily dissolved in general organic solvents. Such metal-containing monomers are dissolved in slight amount in a large amount of alcohol-based solvent, however, when left for a certain period, manifest a tendency of deposition of a crystal, leading to poor storage stability.

When a metal-containing resin is produced by copolymerizing a metal-containing monomer with an acrylic monomer and the like in an organic solvent, copolymerizing property is low because a metal-containing monomer is not easily dissolved also with an acrylic monomer, and it is difficult to introduce a metal in sufficient amount into a polymer. Further, when a metal-containing monomer is added as a cross-linking agent to an acrylic oligomer or the like which is a ultraviolet ray-curing material, to produce a metal-containing resin, degree of cross-linking is low because the monomer is not easily solved uniformly in the oligomer, consequently, it is difficult to obtain sufficient abilities.

When a metal-containing resin obtained by introducing a metal salt into a high acid value resin described in JP-B No. 61-3830 is used as a resin for an antifouling paint, there is a tendency of decrease in water-resistance and antifouling property for a long period of a painted film. Further, this metal-containing resin has a problem that when copper oxide generally used as an antifouling agent causing duration of an excellent antifouling effect in sea for a long period of time is added, the paint is easily gelled.

Moreover, a metal-containing monomer described in JP-A No. 5-171066 has a problem that copolymerizability with acrylic monomers and the like is low, and a copolymer insoluble in a solvent is often obtained, because this metal-containing monomer is not easily dissolved with an organic solvent and acrylic monomer and the like as described above. Further, a film obtained from this antifouling paint composition tends to easily cause cracking and peeling with the lapse of time.

Furthermore, when resins having a specific divalent metal-containing group at the end of a side chain described in JP-A Nos. 62-57464 and 62-84168 are used as a resin for an antifouling resin, stability of hydrolysis of the film is low, and antifouling property of a long period is insufficient. Additionally, there is a problem that, when copper oxide is added, self polishing property decreases, and this tendency becomes remarkable particularly in a paint stored for a long period of time.

SUMMARY OF THE INVENTION

An object of the present invention is to provide a metal-containing monomer dissolved mixture which is soluble in a general organic solvent, excellent in storage stability and can be mixed with a general acrylic monomer and the like, a metal-containing resin soluble in a general organic solvent obtained by using this monomer dissolved mixture as a raw material, and an antifouling paint composition manifesting duration of an antifouling effect in sea for a long period of time.

The present inventors have intensively studied for attaining the above-mentioned object, and resultantly found that a metal-containing monomer dissolved mixture comprising, as constituent components, a reaction product of an inorganic metal compound with a carboxyl group-containing radical polymerizable monomer, a specific organic solvent, and water of specific amount; and a metal-containing resin obtained by using this monomer dissolved mixture as a raw material, perform an excellent effect, and that an antifouling paint composition containing this metal-containing resin as a vehicle component, and an antifouling resin composition comprising a divalent metal-containing resin, a specific compound and copper oxide perform an excellent effect, leading to completion of the present invention.

Namely, the present invention provides a metal-containing monomer dissolved mixture comprising a reaction product of an inorganic metal compound with a carboxyl group-containing radical polymerizable monomer, an organic solvent including at least an alcohol-based solvent, and water, wherein the water content is from 0.01 to 30% by weight; further, a metal-containing resin obtained by copolymerizing the metal-containing monomer (A) in this mixture with the other radical-polymerizable unsaturated monomer (B).

Further, the present invention provides an antifouling paint composition obtained by using the above-mentioned metal-containing resin, and an antifouling paint composition comprising a divalent metal-containing resin (C), a compound (D) of the following general formula (I), and copper oxide (E):

$R^1$—SH          (I)

wherein, $R^1$ represents an organic group having 1 to 30 carbon atoms.

DETAILED DESCRIPTION OF THE PREFERRED EMBODIMENTS

In the present invention, the inorganic metal compound is used as a constituent component of a metal-containing monomer dissolved mixture which is soluble in an organic solvent, and reacts with a carboxyl group-containing radical polymerizable monomer to form a metal salt. As the inorganic metal compound, for example, oxides, hydroxides, chlorides and the like of metals are listed. The inorganic metal compound is not limited to them, and those reacting with a carboxyl group to form a metal salt can be used.

As the oxide of a metal, for example, zinc oxide, aluminum oxide, calcium oxide, copper oxide, magnesium oxide, manganese oxide and the like are listed. As the hydroxide of a metal, for example, zinc hydroxide, aluminum hydroxide, calcium hydroxide, copper hydroxide, magnesium hydroxide and the like are listed. As the chloride of a metal, for example, zinc chloride, aluminum chloride, calcium chloride, cupric chloride, magnesium chloride, manganese chloride and the like are listed.

Metals of the inorganic metal compound are selected from the group consisting of Ib, IIa, IIb, IIIa, IIIb, IVa, IVb, Va, Vb, VIb, VIIb, and VIII group metals in the periodic table, and if necessary, two or more of them may be used. Among them, zinc, magnesium, calcium, copper and aluminum are preferable because a mixture containing them tends to be excellent in storage stability. Further, zinc, magnesium, calcium and aluminum were preferable because resins obtained from them are excellent in transparency. Particularly, divalent zinc and magnesium are preferable because increase in viscosity in producing a resin can be suppressed. When copper is used as a metal in the inorganic metal compound, zinc is preferably used together for the purpose of increasing copolymerizability with an acrylic monomer. From the standpoint of use in an antifouling paint, when zinc or magnesium is used as a metal in the inorganic metal compound, hue of a film of an antifouling paint tends to become beautiful because the resulted metal-containing resin has high transparency, further, because solubility thereof in a general organic solvent is high, productivity of a resin becomes good, and viscosity of the resultant resin and paint tends to be easily controlled by a diluting solvent. Particularly, when zinc is more preferably used because water-resistance of a film becomes good.

In the present invention, disclosed as examples of the carboxyl group-containing radical polymerizable monomer are methacrylic acid, acrylic acid, itaconic acid, (anhydrous) maleic acid, monoalkyl itaconate (alkyl is, for example, methyl, ethyl, butyl, 2-ethylhexyl or the like), monoalkyl-maleate (alkyl is, for example, methyl, ethyl, butyl, 2-ethylhexyl or the like), and the like. These can be used alone or in combination of two or more selected appropriately. Among them, methacrylic acid and acrylic acid are preferable because storage stability of the mixture for a long period is excellent.

In the present invention, the organic solvents include at least an alcohol-based solvent. As the alcohol-based solvent, ethanol, isopropanol, butanol, propylene glycol monomethyl ether and the like are preferable, particularly from the standpoint of solubility of a metal salt compound (reaction product). It is not preferable to use an organic solvent containing no alcohol-based solvent because the solution easily loses flowability and is solidified in reaction, and it is difficult to obtain a solution in a transparent state.

Further, if necessary, a mixed solvent composed of an alcohol-based solvent and other organic solvents can be used. As other organic solvents, there are listed, for example, aliphatic hydrocarbon-based solvents such as pentane, hexane, heptane and the like; aromatic hydrocarbon-based solvents such as benzene, toluene, xylene and the like; ester-based solvents such as ethyl acetate, butyl acetate, isobutyl acetate and the like; ketone-based solvents such as methyl ethyl ketone, methyl isobutyl ketone, cyclohexanone and the like; etc. In the mixed solvent, the proportion of an alcohol-based solvent is preferably 5 wt % or more. When the proportion is 5 wt % or more, solubility of a metal salt compound (reaction product) in a solvent increases and a crystal is not formed, consequently, storage stability is manifested. More preferably, the proportion is 25 wt % or more.

The preferable metal content of the metal-containing monomer dissolved mixture of the present invention is from 0.1 to 60 wt %. By controlling the proportion to 60 wt % or less, it becomes easy to obtain a metal-containing monomer dissolved mixture in a transparent state, and the copolymerizability of the metal-containing monomer with acrylic monomers becomes high. By controlling the proportion to 0.1 wt % or more, the amount of organic solvent in the mixture can be decreased, and handling property is improved, and in polymerizing the metal-containing resin composition, high solidification is possible. More preferably, the proportion is from 3 to 25 wt %.

The ratio of inorganic metal compound-derived components to carboxyl group-containing radical polymerizable monomer-derived components in the metal-containing monomer dissolved mixture of the present invention is not particularly restricted, and the preferable ratio (molar number) of inorganic metal compound-derived components is 0.6 mol or less based on 1 mol of carboxyl group-containing radical polymerizable monomer-derived components. When this is 0.6 mol or less, transparency of a mixture has no particular, however, when over 0.6 mol, an unreacted inorganic metal compound tends to remain in a mixture, leading to poor transparency of a monomer, therefore, varnish (metal containing resin) obtained by polymerizing this tends to be turbid.

Further, when the metal-containing monomer dissolved mixture of the present invention is used in production of a metal-containing resin as a vehicle for an antifouling paint as described later, regarding the ratio of inorganic metal compound-derived components to carboxyl group-containing radical polymerizable monomer-derived components in the metal-containing monomer dissolved mixture, it is particularly preferable that the ratio (molar number) of inorganic metal compound-derived components is about 0.5 mol based on 1 mol of carboxyl group-containing radical polymerizable monomer-derived components. However, when the ratio (molar number) of inorganic metal compound-derived components is fairly large based on carboxyl group-containing radical polymerizable monomer-derived components, there is no particular problem on film abilities. When the ratio is too small, water-resistance of a film decreases, and when copper oxide is compounded, storage stability of a paint lowers.

The amount was water contained in the metal-containing monomer dissolved mixture of the present invention is preferably from 0.01 to 30 wt %. In the present invention, the term "amount of water" excludes the amount water produced by reaction of an inorganic metal compound with a carboxyl group-containing radical polymerizable monomer. All of water may be added in the reaction, or water may be added partially during the reaction and added again after completion of the reaction.

When water is not added during the reaction, a solution tends to lose flowability and is solidified in or directly after the reaction of an inorganic metal compound with a carboxyl group-containing radical polymerizable monomer, consequently, it is difficult that the metal-containing monomer is mixed with an acrylic monomer and polymerized. Further, once solidified, a large amount of water and solvent are necessary for redissolution, consequently, workability decreases due to separation from an acrylic monomer or decrease in solid content. On the other hand, by adding water during the reaction, a reaction solution maintaining flowability in which a metal-containing monomer is dissolved in an organic solvent can be obtained, and it becomes easy to mix and copolymerize it with an acrylic monomer.

The amount of water added during the reaction is preferably 0.01 wt % or more, more preferably 0.2 wt % or more, for keeping solution condition without losing flowability of a solution during the reaction. If a metal-containing monomer dissolved mixture in form of a solution is obtained, it becomes easy to mix and copolymerize it with an acrylic monomer. The amount of water in a metal-containing monomer dissolved mixture is preferably 30 wt % or less, more preferably 15 wt % or less from the standpoints of storage stability at lower temperature of a metal-containing monomer dissolved mixture, solubility in a general acrylic monomer and organic solvent, and copolymerizability with various acrylic monomers.

Further, when the content of organic solvents is increased for the purpose of lowering the water content in a metal-containing monomer dissolved mixture, solid content decreases and the amount of organic solvents used in polymerization increases, therefore, increase in organic solvents is not preferable from the standpoint of high solidification of the resin. For reducing the amount of organic solvents in a metal-containing monomer dissolved mixture, it is preferable that the metal-containing monomer dissolved mixture contains water in a proportion of 0.01 to 5-fold based on the mol number of an inorganic metal compound used, and it is preferable that the solid content of the mixture is from 25 to 70 wt %. Particularly, water of 0.05 to 3-fold mol is preferably contained, and the solid content of a mixture is preferably from 45 to 60 wt %.

Further, when the metal-containing monomer dissolved mixture of the present invention is used in production of a metal-containing resin as a vehicle for an antifouling paint as described later, the water content in the metal-containing monomer dissolved mixture is preferably 20 wt % or less. In this case, the water amount contained in a metal-containing resin decreases, and increase in viscosity in processing into a paint can be suppressed and decrease in hydrolysis property of a film can be suppressed. The water content is more preferably 15 wt % or less.

The metal-containing resin of the present invention is obtained by copolymerizing the metal-containing monomer (A) in the dissolved mixture of the present invention described above with the other radical polymerizable unsaturated monomer (B). The metal-containing resin of the present invention is soluble in a general organic solvent by using the metal-containing monomer dissolved mixture as a raw material. When the metal-containing resin of the present invention is used, for example, as a vehicle for an antifouling paint, the film shows high self polishing property for a long period of time and manifests excellent antifouling effect.

In the metal-containing resin of the present invention as a vehicle for an antifouling paint, the amount of a radical polymerizable unsaturated monomer (B) used is preferably from 16 to 97 parts by weight based on 100 parts by weight of the total amount of the component (A) and component (B). By controlling the amount to 16 parts by weight or more, balance between various properties of the resulting antifouling paint tends to be regulated. By controlling the amount to 97 parts by weight or less, there is a tendency that excellent hydrolysis property for a long period is imparted to the formed film, and balance between cracking resistance and hydrolysis property becomes good. The amount is more preferably from 40 to 90 parts by weight, particularly preferably from 60 to 85 parts by weight.

Examples of the radical polymerizable unsaturated monomer (B) include (meth)acrylate monomers such as methyl (meth)acrylate, ethyl (meth)acrylate, 2-methoxyethyl (meth) acrylate, 2-ethoxyethyl (meth)acrylate, phenoxyethyl (meth) acrylate, 2-(2-ethylhexaoxy)ethyl (meth)acrylate, 1-methyl-2-methoxyethyl (meth)acrylate, 3-methoxybutyl (meth) acrylate, 3-methyl-3-methoxybutyl (meth)acrylate, m-methoxyphenyl (meth)acrylate, p-methoxyphenyl (meth) acrylate, o-methoxyphenylethyl (meth)acrylate, m-methoxyphenylethyl (meth)acrylate, p-methoxyphenyethyl (meth)acrylate, n-propyl (meth) acrylate, i-propyl (meth)acrylate, n-butyl (meth)acrylate, i-butyl (meth)acrylate, t-butyl (meth)acrylate, 2-ethylhexyl (meth)acrylate, lauryl (meth)acrylate, stearyl (meth) acrylate, benzyl (meth)acrylate, phenyl (meth)acrylate, isobornyl (meth)acrylate, cyclohexyl (meth)acrylate, glycidyl (meth)acrylate and the like; hydroxyl group-containing monomers such as 2-hydroxyethyl (meth)acrylate, 2-hydroxypropyl (meth)acrylate, 3-hydroxypropyl (meth) acrylate, 2-hydroxybutyl (meth)acrylate, 4-hydroxybutyl (meth)acrylate and the like; adducts of 2-hydroxyethyl (meth)acrylate with ethylene oxide, propylene oxide, γ-butyrolactone or ε-caprolactone and the like; dimers or trimers such as 2-hydroxyethyl (meth)acrylate, 2-hydroxypropyl (meth)acrylate and the like; primary and secondary amino group-containing vinyl monomers such as butylaminoethyl (meth)acrylate, (meth)acrylamide and the like; tertiary amino group-containing vinyl monomers such as dimethylaminoethyl (meth)acrylate, diethylaminmoethyl (meth)acrylate, dimethylaminopropyl (meth)acrylate, dimethylaminobutyl (meth)acrylate, dibutylaminoethyl (meth) acrylate, dimethylaminoethyl (meth)acrylamide, dimethylaminopropyl (meth)acrylamide and the like; heterocyclic basic monomers such as vinylpyrrolidone, vinylpiridine, vinylcarbazole and the like; additionally, vinyl-based monomers such as styrene, vinyltoluene, α-methylstyrene, (meth) acrylonitrile, vinyl acetate, vinyl propionate and the like. In the present invention "(meth)acryl" means "acryl and/or methacryl".

The content of a metal in the metal-containing resin of the present invention is preferably from 0.5 to 25 wt %. By controlling the amount to 0.5 wt % or more, self polishing property of the formed film tends to be manifested, and by controlling the amount to 25 wt % or less, there is a tendency that an effect to improved balance between cracking resistance and hydrolysis property becomes remarkable, self polishing property for a long period of time is maintained, and an antifouling effect is improved. More preferably, the amount thereof is from 1 to 10 wt %.

The weight-average molecular weight of the metal-containing resin of the present invention is preferably from 1000 to 20000. By controlling the molecular weight to 20000 or less, metal cross-linking between polymers can be reduced by lowering the viscosity of a resin solution, gelling of a resin can be suppressed, and a metal in amount to manifest hydrolysis property can be integrated into a resin successfully. By controlling the molecular weight to 1000 or more, cracking resistance tends to be manifested. More preferably, the molecular weight is from 3000 to 10000.

A method of producing the metal-containing resin of the present invention is not particularly restricted. For example, it can be produced by mixing a metal-containing monomer dissolved mixture with a radical polymerizable unsaturated monomer, and copolymerizing them in the presence of a radical initiator at a temperature from 60 to 180° C. for 5 to 14 hours. When the metal content in a copolymer is increased, a chain transfer agent can be used for high solidification and improvement in productivity, particularly, suppressing of production of insoluble substances in polymerization. From the standpoint of compatibility with a monomer containing a metal, chain transfer agents other than mercaptane are preferably, and particularly, a styrene dimer and the like are preferable. As the polymerization method, an emulsion polymerization method, suspension polymerization method and the like can be adopted in addition to a solution polymerization method effected in an organic solvent. Particularly, a solution polymerization method using a general organic solvent such as toluene, xylene, methyl isobutyl ketone, n-butyl acetate or the like is advantageous from the standpoints of productivity and painting ability.

The proportion of a copolymer as a vehicle in an antifouling paint composition is not particularly restricted, and it is preferable to use a copolymer usually in a proportion of 20 to 25 wt % (solid content) as a resin component in an antifouling paint composition. The reason for this is that, by appropriate inclusion of a resin component, film abilities such as cracking resistance and the like tend to become excellent, and by no excess inclusion, inclusion of an antifouling agent in amount sufficient for keeping excellent antifouling ability into an antifouling paint composition tends to become easy.

The antifouling paint composition of the present invention is obtained by using the metal-containing resin of the present invention described above as a vehicle component. The antifouling paint composition of the present invention can keep excellent antifouling ability of a film by using this metal-containing resin. Further, by compounding, for example, an antifouling agent, antifouling ability can also be further improved.

The antifouling agent may be appropriately selected and used depending on requisite abilities. For example, copper-based antifouling agents such as copper oxide, copper thiocyanate, copper powder and the like, metal compounds of lead, zinc, nickel and the like, amine derivatives such as diphenylamine and the like, nitrile compounds, benzothiazole-based compounds, maleimide-based compounds, pyridine-based compounds and the like are listed. These can be used alone or in combination of two or more. Particularly, compounds selected as subjects of investigated by Nippon Senpaku Kogyo Kai are preferable, and specific examples thereof include manganeseethylene bisdithiocarbamate, zincdimethyl dithiocarbamate, 2-methylthio-4-t-butylamino-6-cyclopropylamino-s-triazine, 2,4,5,6-tetrachloroisophthalonitrile, N,N-dimethyldichlorophenylurea, zinc ethylene bisdithiocarbamate, copper rhodanate, 4,5-dichloro-2-n-ocryl-3(2H) isothiazolone, N-(fluorodichloromethylthio) phthalimide, N,N'-dimethyl-N'-phenyl-(N-fluorodichloromethylthio)sulfamide, zinc 2-pyridinethiol-1-oxide, tetramethylthiuram disulfide, Cu-10% Ni solid solution alloy, 2,4,6-trichlorophenylmaleimide, 2,3,5,6-tetrachloro-4-(methylsulfonyl)pyridine, 3-iodo-2-propylbutylcarbamate, diiodomethyl p-trisulfone, bisdimethyldithiocarbamoylzincethylene bisdithiocarbamate, phenyl(bispyridyl)bismuth dichloride, 2-(4-thiazolyl)-benzimidazole and pyridine-triphenylborane.

In the antifouling paint composition of the present invention, silicon compounds such as dimethylpolysiloxane, silicone oil and the like, fluorine-containing compounds such as carbon fluoride and the like can also be compounded, additionally, for the purpose of imparting lubricity to the surface of a film and preventing adhesion of organisms. Further, extender pigments, coloring pigments, plasticizers, various paint additives, and other resins and the like can be compounds, if necessary.

The antifouling paint composition of the present invention is applied, for example, by an application means such as brush painting, spraying, roller painting, deposition painting and the like directly on the surface of a substrate of underwater structures such as ships, various fishing nets, bay facilities, oil fences, bridges, submarine bases and the like, or on a film formed by painting a wash primer, chlorinated rubber-based or epoxy-based primers, intermediate coating paint and the like, on a substrate. The application amount is usually an amount to give a thickness of a dry film of 50 to 400 μm. Drying of a painted film is usually conducted at room temperature, and heat drying may be effected without problem.

Another antifouling paint composition of the present invention is an antifouling paint composition comprising a divalent metal-containing resin (C), a compound (D) of the following general formula (I), and copper oxide (E):

$$R^1\text{—SH} \qquad (I)$$

wherein, $R^1$ represents an organic group having 1 to 30 carbon atoms.

The divalent metal-containing resin is a vehicle component of an antifouling paint composition, and a film formed by this is dissolved gradually in sea to show self polishing. The divalent metals can be selected and used appropriately. From the standpoint of solubility into an organic solvent, zinc, copper, magnesium and calcium are preferable, among them, zinc and copper particularly preferable.

The metal content in the divalent metal-containing resin (C) is preferably from 3 to 25 wt %. By controlling the content to 3 wt % or more, excellent self polishing property tends to be imparted to a film. The content is more preferably 6 wt % or more. By controlling the content to 25 wt % or less, balance between cracking resistance and hydrolysis property of a film is excellent, and self polishing property for along period of time is maintained, and antifouling effect is improved. The content is more preferably 15 wt % or less.

As a method for producing the divalent metal-containing resin (C), for example, a method of adding a metal to a high acid value resin, and a method of copolymerizing a metal-containing polymerizable monomer, are listed. For keeping excellent storage stability of a film and maintaining stable self polishing property of an antifouling film over a long period of time, a method of copolymerizing a metal-containing polymerizable monomer is preferable. This method is specifically a method in which a metal-containing polymerizable monomer (α) and other radical polymerizable unsaturated monomers (β) are copolymerized.

The metal-containing polymerizable monomer (α) is a component used to impart high self polishing property to the resulting film over a long period and to manifest excellent antifouling effect, and particularly, metal-containing polymerizable monomers ($\alpha_1$) having two unsaturated groups, and metal-containing polymerizable monomers ($\alpha_2$) of the following general formula (II) are preferable.

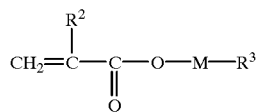

wherein $R^2$ represents a hydrogen atom or methyl group, M represents Mg, Zn or Cu, $R^3$ represents an organic acid residue.

The amount of the metal-containing polymerizable monomer ($\alpha_1$) in the divalent metal-containing resin (C) is not particularly restricted, and preferably from 10 to 80 wt %. By controlling the amount to 10 wt % or more, suitable self polishing property tends to be imparted to a painted film. This amount is more preferably 20 wt % or more. By controlling this amount to 80 wt % or less, antifouling property of a film tends to be maintained. This amount is more preferably 50 wt % or less.

As the metal-containing polymerizable monomer ($\alpha_1$) having two unsaturated groups, there are listed, for example, magnesium acrylate [(CH$_2$=CHCOO)$_2$Mg], magnesium methacrylate [(CH$_2$=C(CH$_3$)COO)$_2$Mg], zinc acrylate [(CH$_2$=CHCOO)$_2$Zn], zinc methacrylate [(CH$_2$=C(CH$_3$)COO)$_2$Zn], copper acrylate [(CH$_2$=CHCOO)$_2$Cu], copper methacrylate [(CH$_2$=C(CH$_3$)COO)$_2$Cu], and the like. These metal-containing polymerizable monomers (α1) can be used alone or in combination of two or more suitably selected if necessary. Among them, zinc (meth)acrylate is preferable because due to high transparency of the resulting polymer product, hue of a film tends to be beautiful, and due to high solubility in a generally used organic solvent, productivity of a resin tends to be excellent.

As a method of producing the metal-containing polymerizable monomer ($\alpha_1$) having two unsaturated groups, a method is preferable in which an inorganic metal compound and a carboxyl group-containing radical polymerizable monomer are reacted together with water in an organic solvent containing an alcohol-based compound. The reaction product containing the ($\alpha_1$) component obtained in this method is excellent in compatibility with the organic solvent and other constituent components (acrylic monomer and the like), and when this reaction product is used, polymerization for obtaining a divalent metal-containing resin (C) tends to become easy. In this case, the production is preferably so conducted that the water content during the reaction is from 0.01 to 30 wt %.

As $R^3$ (organic acid residue) of the metal-containing polymerizable monomer ($\alpha_2$) of the general formula (II), there are listed, for example, those derived from monovalent organic acids such as monochloroacetic acid, monofluoroacetic acid, propionic acid, octylic acid, versatic acid, isostearic acid, palmitic acid, cresotinic acid, α-naphthoic acid, β-naphthoic acid, benzoic acid, 2,4,5-trichlorophenoxyacetic acid, 2,4-dichlorophenoxyacetic acid, quinolinecarboxylic acid, nitrobenzoic acid, nitronaphthalenecarboxylic acid, purvinic acid and the like. These can be appropriately selected and used, if necessary. Among them, fatty acid-based residues are particularly preferable because they tend to be able to maintain a film causing no cracking and peeling over a long period of time.

Specific examples of the metal-containing polymerizable monomer ($\alpha_2$) of the general formula (II) include magnesium monochloroacetate (meth)acrylate, zinc monochloroacetate (meth)acrylate, copper monochloroacetate (meth)acrylate, magnesium monofluoroacetate (meth)acrylate, zinc monofluoroacetate (meth)acrylate, copper monofluoroacetate (meth)acrylate, magnesium propionate (meth) acrylate, zinc propionate (meth)acrylate, copper propionate (meth)acrylate, magnesium octylate (meth)acrylate, zinc octylate (meth)acrylate, copper octylate (meth)acrylate, magnesium versatate (meth)acrylate, zinc versatate (meth) acrylate, copper versatate (meth)acrylate, magnesium isostearate (meth)acrylate, zinc isostearate (meth)acrylate, copper isostearate (meth)acrylate, magnesium palmitate (meth) acrylate, zinc palmitate (meth)acrylate, copper palmitate (meth)acrylate, magnesium cresotate (meth)acrylate, zinc cresotate (meth)acrylate, copper cresotate (meth)acrylate, magnesium α-naphtoate (meth)acrylate, zinc α-naphtoate (meth)acrylate, copper α-naphtoate (meth)acrylate, magnesium β-naphtoate (meth)acrylate, zinc β-naphtoate (meth) acrylate, copper β-naphtoate (meth)acrylate, magnesium-benzoate (meth)acrylate, zinc benzoate (meth)acrylate, copper benzoate (meth)acrylate, magnesium 2,4,5-trichlorophenoxyacetate (meth)acrylate, zinc 2,4,5-trichlorophenoxyacetate (meth)acrylate, copper 2,4,5-trichlorophenoxyacetate (meth)acrylate, magnesium 2,4-dichlorophenoxyacetate (meth)acrylate, zinc 2,4-dichlorophenoxyacetate (meth)acrylate, copper 2,4-dichlorophenoxyacetate (meth)acrylate, magnesium quinolinecarboxylate (meth)acrylate, zinc quinolinecarboxylate (meth)acrylate, copper quinolinecarboxylate (meth)acrylate, magnesium nitrobenzoate (meth)acrylate, zinc nitrobenzoate (meth)acrylate, copper nitrobenzoate (meth)acrylate, magnesium nitronaphthalenecarboxylate (meth)acrylate, zinc nitronaphthalenecarboxylate (meth) acrylate, copper nitronaphthalenecarboxylate (meth) acrylate, magnesium purvate (meth)acrylate, zinc purvate (meth)acrylate, copper purvate (meth)acrylate, and the like. These metal-containing polymerizable monomer ($\alpha_2$) can be used alone or in combination of two or more appropriately selected if necessary. Among them, zinc-containing polymerizable monomers are preferable because due to high transparency of the resulting polymer product, hue of a film tends to be beautiful, and due to high solubility in a generally used organic solvent, productivity of a resin tends to be excellent.

As a method of producing the metal-containing polymerizable monomer ($\alpha_2$), a method is exemplified, for example, in which an inorganic metal compound, a carboxyl group-containing radical polymerizable monomer and non-polymerizable organic acid in an organic solvent containing an alcohol-based compound.

Combination of components ($\alpha_1$) and ($\alpha_2$) as the metal-containing polymerizable monomer ($\alpha$) is preferable because self polishing property of a film tends to be maintained for a long period of time, and sufficient degree of wasting of a film tends to be manifested. Among them, combination of zinc (meth)acrylate with fatty acid-based zinc (meth)acrylate is particularly preferable.

In the case of combination of components ($\alpha_1$) and ($\alpha_2$) as the metal-containing polymerizable monomer ($\alpha$), the molar ratio ($\alpha_1/\alpha_2$) of a component ($\alpha_1$) unit to a component ($\alpha_2$) unit in a copolymer is preferably 20/80 to 80/20. By controlling the ratio to 80/20 or less, film properties excellent in cracking resistance and close adherence tend to be obtained, and by controlling the ratio to 20/80 or more, sufficient self polishing property of a film tends to be maintained for a long period of time. The ratio is preferably from 30/70 to 70/30.

For example, by reacting an inorganic metal compound, a carboxyl group-containing radical polymerizable monomer and a non-polymerizable organic acid in an organic solvent, a monomer dissolved mixture containing a ($\alpha_1$) component and a ($\alpha_2$) component can be obtained. In this case, the amount of the non-polymerizable organic acid used is preferably from 0.01 to 0.95-fold mol base on the inorganic metal compound. By controlling the amount to 0.01-fold mol or more, there occurs a tendency that a solid reaction product which is not easily copolymerized with a radical polymerizable unsaturated monomer (β) is not produced easily, and self polishing property and cracking resistance of an antifouling paint for a long period of time become excellent. By controlling the amount to 0.95-fold mol or less, antifouling ability of an antifouling paint for a long period of time tends to be excellent. More preferable lower limit is 0.3-fold mol, and more preferable upper limit is 0.7-fold mol.

As an organic solvent used for the preparing the metal-containing polymerizable monomer ($\alpha$), an organic solvent containing at least an alcohol-based solvent is preferably used. By use of such organic solvents, production stability of a metal-containing polymerizable monomer ($\alpha$) tends to be excellent. In this case, the content of an alcohol-based compound in the organic solvent is preferably 5 wt % or more. By controlling the content to 5 wt % or more, solubility of the reaction product into the solvent is improved, a metal-containing polymerizable monomer ($\alpha$) can be produced stably, and storage stability of a metal-containing polymerizable monomer ($\alpha$) becomes excellent. More preferably, the amount is 25 wt % or more. As the alcohol-based compound, for example, ethanol, isopropanol, butanol, propylene glycol monomethyl ether and the like are listed.

In the divalent metal-containing resin (C), the unit amount of a radical polymerizable unsaturated monomer (β) is not particularly restricted, and preferably from 20 to 90 wt %. By controlling this amount to 20 wt % or more, flexibility and cracking resistance & peeling property of a film tend to be excellent. This amount is more preferably 50 wt % or more. By controlling this amount to 90 wt % or less, balance between cracking resistance & peeling property of a film and self polishing property for a long period of time tends to be excellent. This amount is more preferably 80 wt % or less.

As the specific examples of the radical polymerizable unsaturated monomer (β), the same examples as the specific examples of the radical polymerizable unsaturated monomer (B) listed above are exemplified.

A method of producing the divalent metal-containing resin (C) is not particularly restricted, and for example, this resin can be produced by mixing the various monomers described above, and reacting this mixture in the presence of a radical initiator at a temperature from 60 to 180° C. for 5 to 14 hours. As the polymerization method, an emulsion polymerization method, suspension polymerization method and the like can be adopted in addition to a solution polymerization method effected in an organic solvent. Particularly, a solution polymerization method using a general organic solvent such as toluene, xylene, methyl isobutyl ketone, n-butyl acetate, propylene glycol monomethyl ether, n-butanol or the like is advantageous from the standpoints of productivity and painting ability.

The amount of the divalent metal-containing resin (C) in the antifouling paint composition of the present invention is preferably from 15 to 25 wt %. By use in amounts in this range, there occurs a tendency that paint abilities such as cracking resistance and the like are maintained, and an antifouling agent in amount sufficient to maintain excellent antifouling ability can be compounded easily in an antifouling paint.

The compound (D) of the general formula (I) is a component which maintains an excellent antifouling effect in sea for a long period of time, and keeps self polishing property of a film even when copper oxide is compounded as an antifouling agent.

Examples of the compound (D) of the general formula (I) include ethylmercaptane, allylmercaptane, isopropylmercaptane, n-propylmercaptane, t-butylmercaptane, isobutylmercaptane, n-butylmercaptane, t-amylmercaptane, s-amylmercaptane, n-hexylmercaptane, t-octylmercaptane, n-octylmercaptane, t-nonylmercaptane, n-decylmercaptane, t-dodecylmercaptane, n-dodecylmercaptane, t-tetradecylmercaptane, t-hexadecylmercaptane, stearylmercaptane, 2-mercaptoethanol, 2-mercaptoethyl octanoate, methyl thioglycolate, octyl thioglycolate, methoxybutyl thioglycolate, methyl mercaptopropionate, octyl mercaptopropionate, methoxybutyl mercaptopropionate, tridecyl mercaptopropioonate, cyclohexylmercaptane, 2-mercaptonaphthalante, 4-mercaptopyridine, thiosalicylic acid, 2-mercaptopropionic acid, 3-mercaptopropionic acid, butanediol bisthioglycolate, ethylene glycol bisthioglycolate, trimethylolpropane tristhioglycolate and the like. These can be used alone or in combination of two or more appropriately selected if necessary. Among them, use of n-dodecylmercaptane, t-dodecdylmercaptane, n-propylmercaptane, n-octylmercaptane and the like of the general formula (I) in which R1 represents an alkyl group is preferable because cracking resistance of a film tends to become excellent. From the standpoint of odor of a film, n-dodecylmercaptane is particularly preferable.

In the case of use of 2-mercaptonaphthalene, 2-mercaptopyridine and the like of the general formula (I) in which $R^1$ has a ring structure such as phenyl and the like, a plasticizer is preferably used together for suppressing cracking of a film.

In the case of use of 3-mercaptopropionic acid, ethylene glycol bisthioglycolate, 2-mercaptopyridine, 4-aminothiophenol and the like of the general formula (I) in which $R^1$ contains a carboxyl group, thiol group or amino group, an alkyl acid is preferably used together for improving storage stability.

In the antifouling paint composition of the present invention,-the proportion of the compound (D) of the general formula (I) is preferably from 0.01 to 0.99-fold based on the metal content (mol number) contained in the divalent metal-containing resin (C). By controlling the proportion to 0.01-fold or more, there occurs a tendency that an excellent antifouling effect in sea can be maintained for a long period of time, and self polishing property of a film can be kept even when copper oxide is used as an antifouling agent. This proportion is preferably 0.1-fold or more. By controlling the proportion to 0.99-fold or less, there occurs a tendency that increase in viscosity in producing an antifouling paint is suppressed, and de-foaming property in painting and cracking resistance of a film tend to become excellent. This proportion is more preferably 0.9-fold or less, further preferably 0.8-fold or less.

The copper oxide (E) has a function as an antifouling agent. It is desirable that the copper oxide (E) is contained in a proportion usually from 25 to 1500 parts by weight based on 100 parts by weight (solid content) of the divalent metal-containing resin (C). By controlling this proportion to 25 parts by weigh or more, excellent antifouling for a long period of time tends to be obtained. This proportion is more preferably 150 parts by weight or more. By controlling the proportion to 1500 parts by weight or less, cracking resistance of a film tends to be excellent. This proportion is more preferably 500 parts by weight or less.

In the antifouling paint composition of the present invention, other compounds can also be compounded as an antifouling agent, if necessary, together with the copper oxide (E). As the specific examples of other compounds, the same compounds as listed previously as the specific examples of an antifouling agent are listed. Among them, zinc 2-pyridinethiol-1-oxide is preferable because they show a tendency of more excellent antifouling effect.

Other materials compounded, if necessary, into this antifouling paint composition, and methods of forming a film are the same as in another antifouling paint composition of the present invention explained previously.

The following examples and comparative examples illustrate the present invention further in detail, but do not limit the scope of the present invention. In the following descriptions, "parts" are by weight.

EXAMPLE 1

Into a four-necked flask equipped with a cooling tube, thermometer, dropping funnel and stirrer was charged 85.4 parts of PGM (propylene glycol methyl ether) and 40.7 parts of zinc oxide, and the mixture was heated up to 75° C. while stirring. Then, a mixture of 43.1 parts of methacrylic acid, 36.1 parts of acrylic acid and 5 parts of water was added dropwise from the dropping funnel over 3 hours at constant speed. After completion of addition, the reaction solution changed from opaque condition to transparent. Further, the solution was stirred for 2 hours, then, to this was added 36 parts of PGM to obtain a transparent metal-containing monomer dissolved mixture A1. The solid content was 44.8%.

EXAMPLE 2

Into the same flask was charged 61.1 parts of nBuOH (n-butanol), 24.3 parts of xylene and 40.7 parts of zinc oxide, and the mixture was heated up to 75° C. while stirring. Then, a mixture of 43.1 parts of methacrylic acid, 36.1 parts of acrylic acid and 5 parts of water was added dropwise from the dropping funnel over 3 hours at constant speed. After completion of addition, the reaction solution changed from opaque condition to transparent. Further, the solution was stirred for 2 hours, then, to this was added 36 parts of nBuOH to obtain a transparent metal-containing monomer dissolved mixture A2. The solid content was 44.9%.

EXAMPLE 3

Into the same flask was charged 24.3 parts of nBuOH, 61.1 parts of xylene and 40.7 parts of zinc oxide, and the mixture was heated up to 75° C. while stirring. Then, a mixture of 43.1 parts of methacrylic acid, 36.1 parts of acrylic acid and 5 parts of water was added dropwise from the dropping funnel over 3 hours at constant speed. After completion of addition, the reaction solution changed from opaque condition to transparent. Further, the solution was stirred for 2 hours, then, to this was added 36 parts of xylene to obtain a transparent metal-containing monomer dissolved mixture A3. The solid content was 44.9%.

EXAMPLE 4

Into the same flask was charged 65.4 parts of PGM and 40.7 parts of zinc oxide, and the mixture was heated up to 75° C. while stirring. Then, a mixture of 43.1 parts of methacrylic acid, 36.1 parts of acrylic acid and 0.5 parts of water was added dropwise from the dropping funnel over 4 hours at constant speed, and after completion of addition, 30 parts of PGM was added. The reaction solution changed from opaque condition to semi-transparent. Further, the solution was stirred for 4 hours, then, to this was added 30.5 parts of PGM to obtain a transparent metal-containing monomer dissolved mixture A4. The solid content was 44.8%.

EXAMPLE 5

Into the same flask was charged 52.9 parts of PGM and 40.7 parts of zinc oxide, and the mixture was heated up to 75° C. while stirring. Then, a mixture of 43.1 parts of methacrylic acid, 36.1 parts of acrylic acid and 12 parts of water was added dropwise from the dropping funnel over 2 hours at constant speed. After completion of addition, the reaction solution changed from opaque condition to transparent. Further, the solution was stirred for 2 hours to obtain a transparent metal-containing monomer dissolved mixture A5. The solid content was 59.6%.

EXAMPLE 6

Into the same flask was charged 85.4 parts of PGM and 40.7 parts of zinc oxide, and the mixture was heated up to 75° C. while stirring. Then, a mixture of 52.2 parts of methacrylic acid, 28.8 parts of acrylic acid and 7 parts of water was added dropwise from the dropping funnel over 3 hours at constant speed. After completion of addition, the reaction solution changed from opaque condition to transparent. Further, the solution was stirred for 2 hours, then, to this was added 11.3 parts of PGM to obtain a transparent metal-containing monomer dissolved mixture A6. The solid content was 49.8%.

EXAMPLE 7

Into the same flask was charged 85.4 parts of PGM and 40.7 parts of zinc oxide, and the mixture was heated up to 75° C. while stirring. Then, a mixture of 34.8 parts of methacrylic acid, 43.2 parts of acrylic acid and 6 parts of water was added dropwise from the dropping funnel over 3 hours at constant speed. After completion of addition, the reaction solution changed from opaque condition to transparent. Further, the solution was stirred for 2 hours, then, to this was added 9.3 parts of PGM to obtain a transparent metal-containing monomer dissolved mixture A7. The solid content was 49.9%.

EXAMPLE 8

Into the same flask was charged 85.4 parts of PGM and 38.7 parts of zinc oxide, and the mixture was heated up to 75° C. while stirring. Then, a mixture of 43.1 parts of methacrylic acid, 36.1 parts of acrylic acid and 5 parts of water was added dropwise from the dropping funnel over 3 hours at constant speed. After completion of addition, the reaction solution changed from opaque condition to transparent. Further, the solution was stirred for 2 hours, then, to this was added 34.5 parts of PGM to obtain a transparent metal-containing monomer dissolved mixture A8. The solid content was 43.1%.

EXAMPLE 9

Into the same flask was charged 85.4 parts of PGM and 46.8 parts of zinc oxide, and the mixture was heated up to 75° C. while stirring. Then, a mixture of 46.1 parts of methacrylic acid, 36.1 parts of acrylic acid and 5 parts of water was added dropwise from the dropping funnel over 3 hours at constant speed. After completion of addition, the reaction solution changed from opaque condition to semi-transparent. Further, the solution was stirred for 4 hours, then, to this was added 43.5 parts of PGM to obtain a slightly turbid metal-containing monomer dissolved mixture A9. The solid content was 44.9%.

EXAMPLE 10

Into the same flask was charged 85.4 parts of PGM and 20.2 parts of magnesium oxide, and the mixture was heated up to 75° C. while stirring. Then, a mixture of 43.1 parts of methacrylic acid, 36.1 parts of acrylic acid and 5 parts of water was added dropwise from the dropping funnel over 3 hours at constant speed. After completion of addition, the reaction solution changed from opaque condition to transparent. Further, the solution was stirred for 2 hours, then, to this was added 11 parts of PGM to obtain a transparent metal-containing monomer dissolved mixture A10. The solid content was 44.6%.

EXAMPLE 11

Into the same flask was charged 70 parts of PGM, 15.4 parts of water and 40.7 parts of zinc oxide, and the mixture was heated up to 75° C. while stirring. Then, a mixture of 43.1 parts of methacrylic acid, 36.1 parts of acrylic acid and 20.6 parts of water was added dropwise from the dropping funnel over 3 hours at constant speed. After completion of addition, the reaction solution changed from opaque condition to transparent. Further, the solution was stirred for 2 hours, then, to this was added 20.4 parts of PGM to obtain a transparent metal-containing monomer dissolved mixture A11. The solid content was 44.2%.

EXAMPLE 12

Into the same flask was charged 85.4 parts of PGM, 40.5 parts of zinc oxide and 0.2 parts of copper oxide, and the mixture was heated up to 75° C. while stirring. Then, a mixture of 43.1 parts of methacrylic acid, 36.1 parts of acrylic acid and 5 parts of water was added dropwise from the dropping funnel over 3 hours at constant speed. After completion of addition, the reaction solution changed to green. Further, the solution was stirred for 2 hours, then, to this was added 11 parts of PGM to obtain a transparent metal-containing monomer dissolved mixture A12. The solid content was 44.9%.

Comparative Example 1

Into the same flask was charged 85.4 parts of PGM and 40.7 parts of zinc oxide, and the mixture was heated up to 75° C. while stirring. Then, a mixture of 43.1 parts of methacrylic acid and 36.1 parts of acrylic acid was added dropwise from the dropping funnel over 3 hours at constant speed. Before completion of addition, the reaction solution was solidified and was not obtained in the form of liquid.

Comparative Example 2

Into the same flask was charged 85.4 parts of PGM and 40.7 parts of zinc oxide, and the mixture was heated up to 75° C. while stirring. Subsequently, a mixture of 43.1 parts of methacrylic acid, 36.1 parts of acrylic acid and 0.01 part of water was added dropwise from the dropping funnel over 3 hours at constant speed. Before completion of addition, the reaction solution was solidified and was not obtained in the form of liquid.

Comparative Example 3

Into the same flask was charged 85.4 parts of xylene and 40.7 parts of zinc oxide, and the mixture was heated up to 75° C. while stirring. Subsequently, a mixture of 43.1 parts of methacrylic acid, 36.1 parts of acrylic acid and 5 parts of water was added dropwise from the dropping funnel over 3 hours at constant speed. Before completion of addition, the reaction solution was solidified and was not obtained in the form of liquid.

Comparative Example 4

Into the same flask was charged 85.4 parts of water and 40.7 parts of zinc oxide, and the mixture was heated up to 75° C. while stirring. Subsequently, a mixture of 43.1 parts of methacrylic acid, 36.1 parts of acrylic acid and 5 parts of water was added dropwise from the dropping funnel over 3 hours at constant speed. Directly after addition, an aggregate began to be formed, and before completion of addition, the reaction solution was solidified and was not obtained in the form of liquid.

The charging amount (molar ratio), the amount of a solvent in metal-containing monomer dissolved mixture and water content thereof (wt %), and the solid content in metal-containing monomer dissolved mixture in Examples and Comparative Examples are shown in Table 1.

(1) Test of Storage Stability of Metal-containing Monomer Dissolved Mixture

The metal-containing monomer dissolved mixtures in Examples 1 to 12 were stored for 3 months at room temperature (25° C.) and lower temperature (5° C.), and the transparency of the monomer dissolved mixture was confirmed every one month. The results are shown in Table 2.

A case of no deposition of an insoluble substance at all in a mixture was evaluated by ○, a case of slight deposition of an insoluble substance in a mixture was evaluated by Δ, and a case of significant deposition of insoluble substances and turbidity of a mixture was evaluated by X.

(2) Test of Mixing of Metal-containing Monomer Dissolved Mixture with Acrylic Monomer The metal-containing monomer dissolved mixtures in Examples 1 to 12 were mixed with a general acrylic monomer, MMA (methyl methacrylate), nBA (butyl acrylate), iBMA (isobutylmethacrylate), 2-EHA (2-ethylhexyl acrylate) or SLMA (lauryl methacrylate), respectively at a ratio of 1:1, and the mixture was left for one hour, then, this mixed solution was checked. The results are shown in Table 2.

A solution mixed uniformly manifesting transparency is evaluated as transparent, a solution showing slight turbidity is evaluated as slight turbidity, and a solution showing complete separation is evaluated as separation.

TABLE 1

| | Charging amount (molar ratio) | | | | | | Content in metal-containing monomer dissolved mixture (wt %) | | | | Solid content (%) |
|---|---|---|---|---|---|---|---|---|---|---|---|
| | MAA | AA | ZnO | MgO | CuO | Water | PGM | nBuOH | Xylene | Water | |
| Ex. 1 | 0.5 | 0.5 | 0.5 | | | 0.27 | 49.3 | — | — | 2.0 | 44.8 |
| Ex. 2 | 0.5 | 0.5 | 0.5 | | | 0.27 | — | 39.4 | 9.9 | 2.0 | 44.9 |
| Ex. 3 | 0.5 | 0.5 | 0.5 | | | 0.27 | — | 9.9 | 39.4 | 2.0 | 44.9 |
| Ex. 4 | 0.5 | 0.5 | 0.5 | | | 0.027 | 51.1 | — | — | 0.2 | 44.8 |
| Ex. 5 | 0.5 | 0.5 | 0.5 | | | 0.67 | 28.6 | — | — | 6.5 | 59.6 |
| Ex. 6 | 0.6 | 0.4 | 0.5 | | | 0.39 | 42.9 | — | — | 3.1 | 49.8 |
| Ex. 7 | 0.4 | 0.6 | 0.5 | | | 0.33 | 43.2 | — | — | 2.7 | 49.9 |
| Ex. 8 | 0.5 | 0.5 | 0.475 | | | 0.27 | 49.4 | — | — | 2.1 | 43.1 |
| Ex. 9 | 0.5 | 0.5 | 0.575 | | | 0.27 | 49.6 | — | — | 1.9 | 44.9 |
| Ex. 10 | 0.5 | 0.5 | | 0.5 | | 0.27 | 48.0 | — | — | 2.5 | 44.6 |
| Ex. 11 | 0.5 | 0.5 | 0.5 | | | 2.0 | 25.7 | — | — | 14.6 | 44.2 |
| Ex. 12 | 0.5 | 0.5 | 0.4975 | | 0.0025 | 0.27 | 49.3 | — | — | 2.0 | 44.9 |
| Comp. Ex. 1 | 0.5 | 0.5 | 0.5 | | | — | 41.6 | — | — | — | — |
| Comp. Ex. 2 | 0.5 | 0.5 | 0.5 | | | 0.0006 | 41.6 | — | — | 0.005 | — |
| Comp. Ex. 3 | 0.5 | 0.5 | 0.5 | | | 0.27 | — | — | 40.6 | 2.4 | — |
| Comp. Ex. 4 | 0.5 | 0.5 | 0.5 | | | 5.02 | — | — | — | 43.0 | — |

Note)
Content of water in metal-containing monomer dissolved mixture described in Table 1 means value excepting water produced by reaction.

TABLE 2

| | Storage stability of monomer | | | | Acrylic monomer mixing property | | | | |
|---|---|---|---|---|---|---|---|---|---|
| | 5° C. | | 25° C. | | | | | | |
| | 3 months | | 3 months | | | | | | |
| | Initial | after | Initial | after | MMA | nBA | iBMA | 2-EHA | SLMA |
| Ex. 1 | ○ | ○ | ○ | ○ | Transparent | Transparent | Transparent | Transparent | Transparent |
| Ex. 2 | ○ | ○ | ○ | ○ | Transparent | Transparent | Transparent | Transparent | Transparent |
| Ex. 3 | ○ | ○ | ○ | ○ | Transparent | Transparent | Transparent | Transparent | Transparent |
| Ex. 4 | ○ | ○ | ○ | ○ | Transparent | Transparent | Transparent | Transparent | Transparent |

TABLE 2-continued

| | Storage stability of monomer | | | | Acrylic monomer mixing property | | | | |
|---|---|---|---|---|---|---|---|---|---|
| | 5° C. | | 25° C. | | | | | | |
| | 3 months | | 3 months | | | | | | |
| | Initial | after | Initial | after | MMA | nBA | iBMA | 2-EHA | SLMA |
| Ex. 5 | ○ | ○ | ○ | ○ | Transparent | Transparent | Transparent | Transparent | Transparent |
| Ex. 6 | ○ | ○ | ○ | ○ | Transparent | Transparent | Transparent | Transparent | Transparent |
| Ex. 7 | ○ | ○ | ○ | ○ | Transparent | Transparent | Transparent | Transparent | Transparent |
| Ex. 8 | ○ | ○ | ○ | ○ | Transparent | Transparent | Transparent | Transparent | Trans parent |
| Ex. 9 | Δ | Δ | Δ | Δ | Slight turbidity | Slight turbidity | Slight turbidity | Slight turbidity | Slight turbidity |
| Ex. 10 | ○ | ○ | ○ | ○ | Transparent | Transparent | Transparent | Transparent | Transparent |
| Ex. 11 | ○ | Δ | ○ | ○ | Transparent | Transparent | Transparent | Transparent | Trans parent |
| Ex. 12 | ○ | Δ | ○ | Δ | Green, no turbidity | Green, no turbidity | Green, no turbidity | Green, no turbidity | Green, no turbidity |

The reaction product in Comparative Examples 1 to 4 was solidified in reaction and was not obtained in the form of dissolved mixture. On the other hand, the metal-containing monomer dissolved mixture in Examples 1 to 12 was not solidified in reaction, dissolved in a general organic solvent, and excellent in storage stability, and had a good mixing property with a general acrylic monomer as shown in Table 2.

EXAMPLE 13

Into the same flask was charged 15 parts of PGM, 57 parts of xylene and 4 parts of ethyl acrylate, and the mixture was heated up to 100° C. while stirring. Subsequently, a transparent mixture of 1 part of methyl methacrylate, 66.2 parts of ethyl acrylate, 5.4 parts of 2-methoxyethyl acrylate, 52 parts of the metal-containing monomer dissolved mixture A1 described in Example 1, 10 parts of xylene, 1 part of a chain transfer agent (Nofmer MSD manufactured by NOF. Corp.), 2.5 parts of AIBN (azobis isobutyronitrile) and 7 parts of AMBN (azobis methylbutyronitrile) was added dropwise over 6 hours at constant speed from the dropping funnel. After completion of addition, 0.5 parts of t-butyl peroctoate and 7 parts of xylene were added dropwise over 30 minutes, the mixture was further stirred for 1 hour and 30 minutes, then, 4.4 parts of xylene was added, to obtain a pale yellow transparent metal-containing resin composition P1 having a heated residue proportion of 45.6%, having a Gardner viscosity of −Y and containing no insoluble substance.

EXAMPLE 14

Into the same flask was charged 15 parts of PGM, 60 parts of xylene and 4 parts of ethyl acrylate, and the mixture was heated up to 100° C. while stirring. Subsequently, a transparent mixture of 10 parts of methyl methacrylate, 62.6 parts of ethyl acrylate, 5.4 parts of 2-methoxyethyl acrylate, 40 parts of the metal-containing monomer dissolved mixture A1 described in Example 1, 10 parts of xylene, 1 part of a chain transfer agent (Nofmer MSD), 2.5 parts of AIBN and 5.5 parts of AMBN was added dropwise over 6 hours at constant speed from the dropping funnel. After completion of addition, 0.5 parts of t-butyl peroctoate and 7 parts of xylene were added dropwise over 30 minutes, the mixture was further stirred for 1 hour and 30 minutes, then, 8 parts of xylene was added, to obtain a pale yellow transparent metal-containing resin composition P2 having a heated residue proportion of 46.1%, having a Gardner viscosity of +V and containing no insoluble substance.

EXAMPLE 15

Into the same flask was charged 15 parts of PGM, 57 parts of xylene and 4 parts of ethyl acrylate, and the mixture was heated up to 100° C. while stirring. Subsequently, a transparent mixture of 14.6 parts of methyl methacrylate, 52. 6 parts of ethyl acrylate, 7.5 parts of n-butyl acrylate, 47.4 parts of the metal-containing monomer dissolved mixture A1 described in Example 1, 10 parts of xylene, 1 part of a chain transfer agent (Nofmer MSD, 2.5 parts of AIBN and 8.5 parts of AMBN was added dropwise over 6 hours at constant speed from the dropping funnel. After completion of addition, 0.5 parts of t-butyl peroctoate and 7 parts of xylene were added dropwise over 30 minutes, the mixture was further stirred for 1 hour and 30 minutes, then, 6.9 parts of xylene was added, to obtain a pale yellow transparent metal-containing resin composition P3 having a heated residue proportion of 45.8%, having a Gardner viscosity of −Z2 and containing no insoluble substance.

EXAMPLE 16

Into the same flask was charged 15 parts of PGM, 61 parts of xylene and 4 parts of ethyl acrylate, and the mixture was heated up to 100° C. while stirring. Subsequently, a transparent mixture of 18 parts of methyl methacrylate, 61 parts of ethyl acrylate, 37.8 parts of the metal-containing monomer dissolved mixture A1 described in Example 1, 10 parts of xylene, 1 part of a chain transfer agent (Nofmer MSD), 2.5 parts of AIBN and 7 parts of AMBN was added dropwise over 6 hours at constant speed from the dropping funnel. After completion of addition, 0.5 parts of t-butyl peroctoate and 7 parts of xylene were added dropwise over 30 minutes, the mixture was further stirred for 1 hour and 30 minutes, then, 8.2 parts of xylene was added, to obtain a pale yellow transparent metal-containing resin composition P4 having a heated residue proportion of 46.0%, having a Gardner viscosity of +T and containing no insoluble substance.

EXAMPLE 17

Into the same flask was charged 15 parts of PGM, 57 parts of xylene and 4 parts of ethyl acrylate, and the mixture was heated up to 100° C. while stirring. Subsequently, a transparent mixture of 5 parts of methyl methacrylate, 64.9 parts of ethyl acrylate, 5.4 parts of 2-methoxyethyl acrylate, 40 parts of the metal-containing monomer dissolved mixture A1 described in Example 1, 6 parts of the metal-containing monomer dissolved mixture A10 described in Example 10, 10 parts of xylene, 1 part of a chain transfer agent (Nofmer MSD), 2.5 parts of AIBN and 6 parts of AMBN was added dropwise over 6 hours at constant speed from the dropping funnel. After completion of addition, 0.5 parts of t-butyl peroctoate and 7 parts of xylene were added dropwise over 30 minutes, the mixture was further stirred for 1 hour and 30 minutes, then, 7.7 parts of xylene was added, to obtain a pale yellow transparent metal-containing resin composition P5 having a heated residue proportion of 46.2%, having a Gardner viscosity of +U and containing no insoluble substance.

EXAMPLE 18

Into the same flask was charged 15 parts of PGM, 57 parts of xylene and 4 parts of ethyl acrylate, and the mixture was heated up to 100° C. while stirring. Subsequently, a green mixture of 1 part of methyl methacrylate, 66.2 parts of ethyl acrylate, 5.4 parts of 2-methoxyethyl acrylate, 52 parts of the metal-containing monomer dissolved mixture A12 described in Example 12, 10 parts of xylene, 1 part of a chain transfer agent (Nofmer MSD), 2.5 parts of AIBN and 7 parts of AMBN was added dropwise over 6 hours at constant speed from the dropping funnel. After completion of addition, 0.5 parts of t-butyl peroctoate and 7 parts of xylene were added dropwise over 30 minutes, the mixture was further stirred for 1 hour and 30 minutes, then, 4.4 parts of xylene was added, to obtain a green metal-containing resin composition P6 having a heated residue proportion of 45.2%, having a Gardner viscosity of +V and containing no insoluble substance.

EXAMPLE 19

Into the same flask was charged 15 parts of PGM and 61 parts of xylene, and the mixture was heated up to 100° C. while stirring. Subsequently, a transparent mixture of 49.55 parts of methyl methacrylate, 50 parts of ethyl acrylate, 1 part of the metal-containing monomer dissolved mixture A1 described in Example 1, 2.5 parts of AIBN and 2 parts of AMBN was added dropwise over 4 hours at constant speed from the dropping funnel. After completion of addition, 0.5 parts of t-butyl peroctoate and 7 parts of xylene were added dropwise over 30 minutes, the mixture was further stirred for 1 hour and 30 minutes, then, 38.45 parts of xylene was added, to obtain a transparent metal-containing resin composition P7 having a heated residue proportion of 44.7%, having a Gardner viscosity of +B and containing no insoluble substance.

EXAMPLE 20

Into the same flask was charged 15 parts of PGM, 61 parts of xylene and 4 parts of ethyl acrylate, and the mixture was heated up to 100° C. while stirring. Subsequently, a transparent mixture of 18 parts of methyl methacrylate, 61 parts of ethyl acrylate, 37.8 parts of the metal-containing monomer dissolved mixture A2 described in Example 2, 10 parts of xylene, 1 part of a chain transfer agent (Nofmer MSD), 2.5 parts of AIBN and 7 parts of AMBN was added dropwise over 6 hours at constant speed from the dropping funnel. After completion of addition, 0.5 parts of t-butyl peroctoate and 7 parts of xylene were added dropwise over 30 minutes, the mixture was further stirred for 1 hour and 30 minutes, then, 8.2 parts of xylene was added, to obtain a pale yellow transparent metal-containing resin composition P8 having a heated residue proportion of 46.2%, having a Gardner viscosity of +Y and containing no insoluble substance.

EXAMPLE 21

Into the same flask was charged 15 parts of PGM, 57 parts of xylene and 4 parts of ethyl acrylate, and the mixture was heated up to 100° C. while stirring. Subsequently, a transparent mixture of 1 part of methyl methacrylate, 64.9 parts of ethyl acrylate, 5.4 parts of 2-methoxyethyl acrylate, 55 parts of the metal-containing monomer dissolved mixture A9 described in Example 9, 10 parts of xylene, 1 part of a chain transfer agent (Nofmer MSD), 2.5 parts of AIBN and 7.5 parts of AMBN was added dropwise over 6 hours at constant speed from the dropping funnel. After completion of addition, 0.5 parts of t-butyl peroctoate and 7 parts of xylene were added dropwise over 30 minutes, the mixture was further stirred for 1 hour and 30 minutes, then, 3.1 parts of xylene was added, to obtain a slightly turbid pale yellow metal-containing resin composition P9 having a heated residue proportion of 46.3% and having a Gardner viscosity of +W.

EXAMPLE 22

Into the same flask was charged 46.8 parts of PGM, 25.2 parts of xylene and 4 parts of ethyl acrylate, and the mixture was heated up to 90° C. while stirring. Subsequently, a transparent mixture of 1 part of methyl methacrylate, 66.2 parts of ethyl acrylate, 5.4 parts of 2-methoxyethyl acrylate, 52 parts of the metal-containing monomer dissolved mixture A11 described in Example 11, 10 parts of PGM, 1 part of a chain transfer agent (Nofmer MSD), 2.5 parts of AIBN and 7.5 parts of AMBN was added dropwise over 6 hours at constant speed from the dropping funnel. After completion of addition, 0.5 parts of t-butyl peroctoate and 7 parts of xylene were added dropwise over 30 minutes, then, the mixture was heated up to 100° C. and further stirred for 1 hour, then, 4.4 parts of xylene was added, to obtain a slightly turbid pale yellow metal-containing resin composition P10 having a heated residue proportion of 45.9% and having a Gardner viscosity of +V.

Production Example C1

Into the same flask was charged 15 parts of PGM, 61 parts of xylene and 4 parts of ethyl acrylate, and the mixture was heated up to 100° C. while stirring. Subsequently, a solution of 18 parts of methyl methacrylate, 61 parts of ethyl acrylate, 7.75 parts of zinc diacrylate in the form of powder (manufactured by Asada Kagaku K. K.), 9.25 parts of zinc dimethacrylate in the form of powder (manufactured by Asada Kagaku K. K.), 18.79 parts of PGM, 2.2 parts of water, 10 parts of xylene, 1 part of a chain transfer agent (Nofmer MSD), 2.5 parts of AIBN and 6 parts of AMBN, the mixture being opaque due to undissolution of the zinc di(meth)acrylate, was added dropwise over 6 hours at constant speed from the dropping funnel. After completion of addition, 0.5 parts of t-butyl peroctoate and 7 parts of xylene were added dropwise over 30 minutes, and further stirred for 2 hours, then, 7.46 parts of xylene was added, to obtain a white resin composition C1 containing mixed insoluble substances having a heated residue proportion of 44.2% and having a Gardner viscosity of A or less.

Production Example C2

Into the same flask was charged 120 parts of xylene and 30 parts of n-butanol, and the mixture was heated up to 110° C. while stirring. Subsequently, a mixture of 60 parts of ethyl acrylate, 25 parts of 2-ethylhexyl acrylate, 15 parts of acrylic acid and 2 parts of AIBN was added dropwise over 3 hours at constant speed from the dropping funnel. After completion of addition, the mixture was stirred for 2 hours to obtain varnish having characteristic values of a heated residue proportion of 39.7% and a Gardner viscosity of +J.

Then, into the same flask was charged 100 parts of the resulted varnish, 20 parts of naphthenic acid and 7 parts of copper hydroxide, and the mixture was heated up to 120° C. and stirred for 2 hours, and water (2.6 g) produced in this operation was de-hydrated to obtain a metal-containing resin composition C2 having characteristic values of a heated residue proportion of 51.9% and a Gardner viscosity of +H.

The charging amounts (ratio by weight) of the metal-containing resin compositions P1 to P10 described in Examples 13 to 22, the viscosities (Gardner) and solid contents (%) of the resulted resin compositions, and the molecular weights (MW) of the resins are described in Table 3. The molecular weight of a metal-containing resin according to HLC-8120GPC was measured by a DMF eluate to which 20 mM LiBr was added, using two TSK-gel α types (α-M). The weigh-average molecular weight was measured in terms of polystyrene.

ing ratios shown in Table 4, using the resin compositions P1 to P6, P8 to P10. Further, antifouling paints of Comparative Examples 5 and 6 were prepared according to compounding ratios shown in Table 4, using the resin compositions C1 and C2.

TABLE 4

|  | Example | | | | | | | | | Comp. Ex. | |
| --- | --- | --- | --- | --- | --- | --- | --- | --- | --- | --- | --- |
|  | 23 | 24 | 25 | 26 | 27 | 28 | 29 | 30 | 31 | 5 | 6 |
| Copolymer |
| P1 | 40 | | | | | | | | | | |
| P2 | | 40 | | | | | | | | | |
| P3 | | | 40 | | | | | | | | |
| P4 | | | | 40 | | | | | | | |
| P5 | | | | | 40 | | | | | | |
| P6 | | | | | | 40 | | | | | |
| P8 | | | | | | | 40 | | | | |
| P9 | | | | | | | | 40 | | | |
| P10 | | | | | | | | | 40 | | |
| C1 | | | | | | | | | | 40 | |
| C2 | | | | | | | | | | | 36 |
| Copper oxide | 50 | 50 | 50 | 50 | 50 | 50 | 50 | 50 | 50 | 50 | 50 |
| Iron oxide | 1.5 | 1.5 | 1.5 | 1.5 | 1.5 | 1.5 | 1.5 | 1.5 | 1.5 | 1.5 | 1.5 |
| Powdered Silica | 3 | 3 | 3 | 3 | 3 | 3 | 3 | 3 | 3 | 3 | 3 |
| DISPERON 4200 | 1.5 | 1.5 | 1.5 | 1.5 | 1.5 | 1.5 | 1.5 | 1.5 | 1.5 | 1.5 | 1.5 |
| Xylene | 7 | 5 | 8 | 5 | 5 | 5 | 7 | 6 | 5 | — | 7 |

Next, the storage stability test, test of degree of wasting of film, antifouling test, and crack-resistance & peeling resistance test were conducted according to the following explanations, using the above-prepared antifouling paints.

TABLE 3

|  | Example | | | | | | | | | |
| --- | --- | --- | --- | --- | --- | --- | --- | --- | --- | --- |
|  | 13 (P1) | 14 (P2) | 15 (P3) | 16 (P4) | 17 (P5) | 18 (P6) | 19 (P7) | 20 (P8) | 21 (P9) | 22 (P10) |
| Metal-containing monomer |
| A1 | 52 | 40 | 47.4 | 37.8 | 40 | | 1 | | | |
| A2 | | | | | | | | 37.8 | | |
| A9 | | | | | | | | | 55 | |
| A11 | | | | | | | | | | 52 |
| A10 | | | | | 6 | | | | | |
| A12 | | | | | | 52 | | | | |
| Copolymerizing monomer |
| MMA | 1 | 10 | 14.6 | 18 | 5 | 1 | 49.55 | 18 | 1 | 1 |
| EA | 70.2 | 66.6 | 56.6 | 65 | 68.9 | 70.2 | 50 | 65 | 68.9 | 70.2 |
| 2-MTA | 5.4 | 5.4 | | | 5.4 | 5.4 | | | 5.4 | 5.4 |
| n-Nba | | | 7.5 | | | | | | | |
| Initiator |
| AIBN | 2.5 | 2.5 | 2.5 | 2.5 | 2.5 | 2.5 | 2.5 | 2.5 | 2.5 | 2.5 |
| AMBN | 7 | 5.5 | 8.5 | 7 | 6 | 7 | 2 | 7 | 7.5 | 8 |
| Chain transfer agent Nofmer MSD | 1 | 1 | 1 | 1 | 1 | 1 | | 1 | 1 | 1 |
| Property value |
| Gardner viscosity | −Y | +V | −Z2 | +T | +U | +V | +B | +Y | +W | +V |
| Solid content (%) | 45.6 | 46.1 | 45.8 | 46.0 | 46.2 | 45.2 | 44.7 | 46.2 | 46.3 | 45.9 |
| Molecular weight (Mw) | 5200 | 6000 | 4800 | 5000 | 5500 | 5200 | 8000 | 5600 | 5000 | 4200 |

EXAMPLES 23 to 31

Comparative Examples 5 and 6

Then, antifouling paints of the present invention (Examples 23 to 31) were prepared according to compound- (1) Storage Stability Test The results of measurement of viscosities of paints directly after production of antifouling paints and after storage in constant temperature water tank at 40° C. for 1 month are shown in Table 5.

(2) Test of Degree of Wasting of Film

Each antifouling paint was applied by an applicator on a hard vinyl chloride plate of 50×50×2 mm (thickness) so that the dry film thickness was 240 µm, the plate was attached to a rotation drum placed in sea water, the drum was rotated at a circumferential speed of 15 knot, and the wasted film thickness was measured every 3 months. The results are shown in Table 6.

(3) Antifouling Test

Each antifouling paint was painted on a sand blasted steel plate on which an anti-corrosive paint had been previously painted so that the dry film thickness was 240 µm to produce a test plate, and this plate was left immersed still for 36 months in Hiroshima bay in Hiroshima prefecture, and the adhesion area (%) of adhesive matters was checked every 6 months. The results are shown in Table 7.

(4) Cracking and Peeling Test

The antifouling paint compositions of Examples 23 to 31 and Comparative Examples 5 and 6 were painted on the following boards (1) and (2) so that the dry film thickness was 240 µm, to produced test plates ① and ②. On the test plate ②, the same antifouling paint as applied in producing the board 2 was applied.

Board (1): A board composed of a sand blasted steel plate on which an anti-corrosive paint had been previously painted.

Board (2): A board obtained by forming on the board (1) a painted film having a film thickness of 240 µm made of the antifouling paint composition of Examples 23 to 31 and Comparative Examples 5 and 6, and immersing this in sterilization-filtrated sea water for 3 months, then, drying it at room temperature for 1 week.

The above-mentioned test plates ① and ② were immersed in sterilization-filtrated sea water for 24 months, and the test plate taken out of sea water was dried for 1 week at room temperature of 20° C. every six months, and cracking and peeling conditions of the film were observed. No cracking and peeling at all is represented by ○, slight occurrence of cracking is represented by Δ, and occurrence of cracking on the whole surface or of peeling is represented by X. The results are shown in Table 8.

TABLE 5

|  | Example | | | | | | | | | Comp. Ex. | |
| --- | --- | --- | --- | --- | --- | --- | --- | --- | --- | --- | --- |
|  | 23 | 24 | 25 | 26 | 27 | 28 | 29 | 30 | 31 | 5 | 6 |
| Viscosity directly after paint production (CPS) | 764 | 685 | 832 | 621 | 655 | 702 | 793 | 755 | 670 | 178 | 302 |
| Viscosity after one month at 40° C. (CPS) | 863 | 733 | 922 | 642 | 745 | 763 | 883 | 805 | 722 | 201 | 4820 |

CPS: Centipoises

TABLE 6

|  | Example | | | | | | | | | Comp. Ex. | |
| --- | --- | --- | --- | --- | --- | --- | --- | --- | --- | --- | --- |
|  | 23 | 24 | 25 | 26 | 27 | 28 | 29 | 30 | 31 | 5 | 6 |
| Wasted film thickness (µm) | | | | | | | | | | | |
| After 3 months | 32 | 14 | 7 | 8 | 22 | 28 | 7 | 35 | 20 | 62 | 13 |
| After 6 months | 65 | 30 | 15 | 18 | 46 | 55 | 17 | 72 | 42 | 81 | 17 |
| After 9 months | 99 | 45 | 22 | 29 | 69 | 84 | 26 | 108 | 63 | 85 | 18 |
| After 12 months | 132 | 59 | 28 | 39 | 93 | 112 | 36 | 144 | 85 | 85 | 18 |
| After 15 months | 162 | 73 | 34 | 48 | 115 | 139 | 44 | 179 | 105 | 85 | 18 |
| After 18 months | 194 | 88 | 41 | 57 | 139 | 168 | 52 | 217 | 127 | 85 | 18 |
| After 21 months | 227 | 104 | 47 | 67 | 163 | 196 | 61 | — | 147 | 85 | 18 |
| After 24 months | — | 120 | 52 | 78 | 188 | 223 | 70 |  | 165 | 85 | 18 |
| Monthly average wasted film thickness (µm) | 10.8 | 5.0 | 2.2 | 3.3 | 7.8 | 9.3 | 2.9 | 12.0 | 6.9 | 3.5 | 0.8 |

TABLE 7

|  | Example | | | | | | | | | Comp. Ex. | |
| --- | --- | --- | --- | --- | --- | --- | --- | --- | --- | --- | --- |
|  | 23 | 24 | 25 | 26 | 27 | 28 | 29 | 30 | 31 | 5 | 6 |
| Adhered area (%) | | | | | | | | | | | |
| After 6 months | 0 | 0 | 0 | 0 | 0 | 0 | 0 | 0 | 0 | 0 | 0 |
| After 12 months | 0 | 0 | 0 | 0 | 0 | 0 | 0 | 0 | 0 | 0 | 0 |
| After 18 months | 0 | 0 | 0 | 0 | 0 | 0 | 0 | 0 | 0 | 50 | 30 |
| After 24 months | 0 | 0 | 0 | 0 | 0 | 0 | 0 | 0 | 0 | 100 | 70 |

TABLE 7-continued

| | Example | | | | | | | | | Comp. Ex. | |
|---|---|---|---|---|---|---|---|---|---|---|---|
| | 23 | 24 | 25 | 26 | 27 | 28 | 29 | 30 | 31 | 5 | 6 |
| After 30 months | 0 | 0 | 10 | 0 | 0 | 0 | 0 | 0 | 0 | 100 | 100 |
| After 36 months | 0 | 0 | 30 | 10 | 0 | 0 | 10 | 0 | 0 | 100 | 100 |

TABLE 8

| | Example | | | | | | | | | Comp. Ex. | |
|---|---|---|---|---|---|---|---|---|---|---|---|
| | 23 | 24 | 25 | 26 | 27 | 28 | 29 | 30 | 31 | 5 | 6 |
| Crack-resistance/ peeling-resistance | | | | | | | | | | | |
| After 6 months | | | | | | | | | | | |
| ① | ◯ | ◯ | ◯ | ◯ | ◯ | ◯ | ◯ | ◯ | ◯ | X | ◯ |
| ② | ◯ | ◯ | ◯ | ◯ | ◯ | ◯ | ◯ | ◯ | ◯ | X | ◯ |
| After 12 months | | | | | | | | | | | |
| ① | ◯ | ◯ | ◯ | ◯ | ◯ | ◯ | ◯ | ◯ | ◯ | X | ◯ |
| ② | ◯ | ◯ | ◯ | ◯ | ◯ | ◯ | ◯ | ◯ | ◯ | X | Δ |
| After 18 months | | | | | | | | | | | |
| ① | ◯ | ◯ | ◯ | ◯ | ◯ | ◯ | ◯ | ◯ | ◯ | X | Δ |
| ② | ◯ | ◯ | ◯ | ◯ | ◯ | ◯ | ◯ | ◯ | ◯ | X | X |
| After 24 months | | | | | | | | | | | |
| ① | ◯ | ◯ | ◯ | ◯ | ◯ | ◯ | ◯ | ◯ | Δ | X | X |
| ② | ◯ | ◯ | ◯ | ◯ | ◯ | ◯ | ◯ | ◯ | Δ | X | X |

Regarding the antifouling paint compositions (Comparative Examples 5 and 6), self polishing property and antifouling property are observed initially, however, after a long period of time, they were not found and antifouling was poor. Further, in Comparative Example 6 in which a metal salt was added to and reacted with a high acid value polymer, increase in viscosity of a paint was observed and storage stability was insufficient, and in Comparative Example 5 in which a powder of a metal salts was polymerized, cracking resistance & peeling resistance was poor and re-coating property was not good.

On the other hand, in the antifouling paint compositions using the metal-containing resin compositions P1 to P6, P8 to P10 (Examples 23 to 31), self polishing property for a long period of time and excellent antifouling ability were shown, further, cracking resistance and peeling resistance were excellent, and re-coating property was excellent.

Production Example M1

In the same manner as in Example 1, into a four-necked flask equipped with a cooling tube, thermometer, dropping funnel and stirrer was charged 85.4 parts of PGM and 40.7 parts of zinc oxide, and the mixture was heated up to 75° C. while stirring. Then, a mixture of 43.1 parts of methacrylic acid, 36.1 parts of acrylic acid and 5 parts of water was added dropwise from the dropping funnel over 3 hours at constant speed. After completion of addition, the reaction solution changed from opaque condition to transparent. Further, the solution was stirred for 2 hours, then, to this was added 36 parts of PGM to obtain a transparent metal-containing monomer dissolved mixture M1. The solid content was 44.8%.

Production Example M2

Into the same flask was charged 72.4 parts of PGM and 40.7 parts of zinc oxide, and the mixture was heated up to 75° C. while stirring. Then, a mixture of 30.1 parts of methacrylic acid, 25.2 parts of acrylic acid and 51.6 parts of versatic acid was added dropwise from the dropping funnel over 3 hours at constant speed. After completion of addition, the reaction solution changed from opaque condition to semi-transparent. Further, the solution was stirred for 2 hours, then, to this was added 11 parts of PGM to obtain a transparent metal-containing monomer dissolved mixture M2. The solid content was 59.6%.

Production Example M3

Into the same flask was charged 60 parts of xylene, 13 parts of PGM (propylene glycol methyl ether) and 40.7 parts of zinc oxide, and the mixture was heated up to 75° C. while stirring. Then, a mixture of 32.3 parts of methacrylic acid, 27 parts of acrylic acid, 37.7 parts of oleic acid, 2.3 parts of acetic acid and 5.8 parts of propionic acid was added dropwise from the dropping funnel over 3 hours at constant speed. After completion of addition, the reaction solution changed from opaque condition to transparent. Further, the solution was stirred for 2 hours to obtain a transparent metal-containing monomer dissolved mixture M3. The solid content was 39.6%.

Production Example P11

Into the same flask was charged 15 parts of PGM, 60 parts of xylene and 4 parts of ethyl acrylate, and the mixture was heated up to 100° C. while stirring. Subsequently, a transparent mixture of 15 parts of methyl methacrylate, 48 parts of ethyl acrylate, 15 parts of n-butyl acrylate, 40.2 parts of the metal-containing monomer dissolved mixture described in Production Example M1, 10 parts of xylene, 1.2 parts of a chain transfer agent (Nofmer MSD), 2.5 parts of AIBN and 6.5 parts of AMBN was added dropwise over 6 hours at constant speed from the dropping funnel. After completion of addition, 0.5 parts of t-butyl peroctoate and 7 parts of xylene were added dropwise over 30 minutes, the mixture was further stirred for 1 hour and 30 minutes, then, 8 parts of xylene was added, to obtain a pale yellow transparent metal-containing resin composition P11 having a solid content of 46.1%, having a Gardner viscosity of –V and containing no insoluble substance.

Production Example P12

Into the same flask was charged 15 parts of PGM, 57 parts of xylene and 4 parts of ethyl acrylate, and the mixture was heated up to 100° C. while stirring. Subsequently, a transparent mixture of 14.6 parts of methylmethacrylate, 52.6 parts of ethyl acrylate, 7.5 parts of n-butyl acrylate, 47.5 parts of the metal-containing monomer dissolved mixture described in Production Example M1, 10 parts of xylene, 1 part of a chain transfer agent (Nofmer MSD), 2.5 parts of AIBN and 8.5 parts of AMBN was added dropwise over 6 hours at constant speed from the dropping funnel. After completion of addition, 0.5 parts of t-butyl peroctoate and 7 parts of xylene were added dropwise over 30 minutes, the mixture was further stirred for 1 hour and 30 minutes, then, 6.9 parts of xylene was added, to obtain a pale yellow transparent metal-containing resin composition P12 having a solid content of 45.8%, having a Gardner viscosity of –Z2 and containing no insoluble substance.

Production Example P13

Into the same flask was charged 15 parts of PGM, 61 parts of xylene and 4 parts of ethyl acrylate, and the mixture was heated up to 100° C. while stirring. Subsequently, a transparent mixture of 18 parts of methyl methacrylate, 61 parts of ethyl acrylate, 37.9 parts of the metal-containing monomer dissolved mixture described in Example M1, 10 parts of xylene, 1 part of a chain transfer agent (Nofmer MSD), 2.5 parts of AIBN and 7 parts of AMBN was added dropwise over 6 hours at constant speed from the dropping funnel. After completion of addition, 0.5 parts of t-butyl peroctoate and 7 parts of xylene were added dropwise over 30 minutes, the mixture was further stirred for 1 hour and 30 minutes, then, 8.2 parts of xylene was added, to obtain a pale yellow transparent metal-containing resin composition P13 having a solid content of 46.0%, having a Gardner viscosity of +T and containing no insoluble substance.

Production Example P14

Into the same flask was charged 15 parts of PGM, 65 parts of xylene and 4 parts of ethyl acrylate, and the mixture was heated up to 100° C. while stirring. Subsequently, a transparent mixture of 28.2 parts of methyl methacrylate, 55 parts of ethyl acrylate, 28.6 parts of the metal-containing monomer dissolved mixture described in Example M1, 10 parts of xylene, 1.2 parts of a chain transfer agent (Nofmer MSD), 2.5 parts of AIBN and 4 parts of AMBN was added dropwise over 6 hours at constant speed from the dropping funnel. After completion of addition, 0.5 parts of t-butyl peroctoate and 7 parts of xylene were added dropwise over 30 minutes, the mixture was further stirred for 1 hour and 30 minutes, then, 9.4 parts of xylene was added, to obtain a pale yellow transparent metal-containing resin composition P14 having a solid content of 45.8%, having a Gardner viscosity of +Y and containing no insoluble substance.

Production Example P15

Into the same flask was charged 10 parts of PGM, 63 parts of xylene and 3 parts of ethyl acrylate, and the mixture was heated up to 100° C. while stirring. Subsequently, a transparent mixture of 9 parts of methyl methacrylate, 58 parts of ethyl acrylate, 50.3 parts of the metal-containing monomer dissolved mixture described in Example M2, 10 parts of PGM and 5 parts of AMBN was added dropwise over 4 hours at constant speed from the dropping funnel. After completion of addition, 0.5 parts of t-butyl peroctoate and 7 parts of xylene were added dropwise over 30 minutes, the mixture was further stirred for 1 hour and 30 minutes, then, 7 parts of xylene was added, to obtain a pale yellow transparent metal-containing resin composition P15 having a solid content of 44.9% and having a Gardner viscosity of +T. No production of cullet such as insoluble substances and the like was found in the resulted resin solution.

Production Example P16

Into the same flask was charged 27.3 parts of PGM, 44.9 parts of xylene and 2 parts of ethyl acrylate, and the mixture was heated up to 100° C. while stirring. Subsequently, a transparent mixture of 16.2 parts of methyl methacrylate, 58.6 parts of ethyl acrylate, 59.9 parts of the metal-containing monomer dissolved mixture described in Example M2, 2.5 parts of AIBN and 1.5 parts of AMBN was added dropwise over 6 hours at constant speed from the dropping funnel. After completion of addition, 0.5 parts of t-butyl peroctoate and 7 parts of xylene were added dropwise over 30 minutes, the mixture was further stirred for 1 hour and 30 minutes, then, 8 parts of xylene was added, to obtain a pale yellow transparent metal-containing resin composition P16 having a solid content of 45.4% and having a Gardner viscosity of +R. No production of cullet such as insoluble substances and the like was found in the resulted resin solution.

Production Example P17

Into the same flask was charged 120 parts of xylene and 30 parts of n-butanol, and the mixture was heated up to 110° C. while stirring. Subsequently, a mixture of 60 parts of ethyl acrylate, 25 parts of 2-ethylhexyl acrylate, 15 parts of acrylic acid and 2 parts of azobisisobutyronitrile was added dropwise over 3 hours at constant speed from the dropping funnel. After completion of addition, the mixture was stirred for 2 hours to obtain varnish having characteristic values of a solid content of 39.7% and a Gardner viscosity of +J.

Next, into the same flask was charged 100 parts of the resulted varnish, 20 parts of naphthenic acid and 7 parts of copper hydroxide, and the mixture was heated up to 120° C. and stirred for 2 hours, and water (2.6 g) produced in this operation was de-hydrated to obtain a metal-containing resin P17 having characteristic values of a heated residue proportion of 51.9% and a Gardner viscosity of +H.

The charging amounts (molar ratio) of the metal-containing resin compositions M1 to M3 in the examples, the amount of a solvent and metal content (wt %) in the metal-containing monomer dissolved mixture, and the solid content (wt %) of the metal-containing monomer dissolved mixture are described in Table 9. The charging amounts (ratio by weight) of the metal-containing resin compositions P11 to P16 in the examples, the viscosities (Gardner) and solid contents (%) of the resulted resin compositions, and the molecular weights (MW) of the resins are described in Table 10. The molecular weight of a metal-containing resin according to HLC-8120GPC was measured by a DMF eluate to which 20 mM LiBr was added, using two TSK-gel α types (α-M). The weigh-average molecular weight was measured in terms of polystyrene.

TABLE 9

| | Charging amount (molar ratio) | | | | | | | | Volatile content in metal-containing monomer mixture (wt % note) | | Metal content (wt %) | Solid content (wt %) |
|---|---|---|---|---|---|---|---|---|---|---|---|---|
| | MMA | AA | ZnO | Water | Versatic acid | Oleic acid | Propionic acid | Acetic acid | Xylene | PGM | | |
| Pro. Ex. M1 | 0.5 | 0.5 | 0.5 | 0.27 | | | | | — | 49.3 | 13.3 | 44.8 |
| Pro. Ex. M2 | 0.35 | 0.35 | 0.5 | | | | 0.3 | | — | 36.1 | 14.2 | 59.6 |

TABLE 9-continued

| | Charging amount (molar ratio) | | | | | | | | Volatile content in metal-containing monomer mixture (wt % note) | | Metal content (wt %) | Solid content (wt %) |
|---|---|---|---|---|---|---|---|---|---|---|---|---|
| | MMA | AA | ZnO | Water | Versatic acid | Oleic acid | Propionic acid | Acetic acid | Xylene | PGM | | |
| Pro. Ex. M3 | 0.375 | 0.375 | 0.5 | | 0.133 | 0.078 | 0.039 | 40.2 | 17.2 | 39.6 | 9.6 | 39.6 |

Note) Excepting water produced in the reaction

TABLE 10

| | Production Example | | | | | |
|---|---|---|---|---|---|---|
| | P11 | P12 | P13 | P14 | P15 | P16 |
| Metal-containing monomer | | | | | | |
| M1 | 18 (40.2) | 21.3 (47.5) | 17 (37.9) | 12.8 (28.6) | | |
| M2 | | | | | 30 (50.3) | |
| M3 | | | | | | 23.2 (58.4) |
| Copolymerization monomer | | | | | | |
| MMA | 15 | 14.6 | 18 | 28.2 | 9 | 16.2 |
| EA | 52 | 56.6 | 65 | 59 | 61 | 60.6 |
| n-BA | 15 | 7.5 | | | | |
| Initiator | | | | | | |
| AIBN | 2.5 | 2.5 | 2.5 | 2.5 | | 1.5 |
| AMBN | 6.5 | 8.5 | 7 | 4 | 5 | 2.5 |
| Chain transfer agent | | | | | | |
| Nofmer MSD | 1.2 | 1 | 1 | 1.2 | | |
| Property value | | | | | | |
| Gardner viscosity | −V | −Z2 | +T | +Y | +T | +R |
| Solid content (wt %) | 46.1 | 45.8 | 46.0 | 45.8 | 44.9 | 45.4 |
| Molecular weight (Mw) | 5400 | 4800 | 5000 | 6500 | 6500 | 6500 |
| Metal content in polymer (wt %) | 5.3 | 6.3 | 5.0 | 3.8 | 7.1 | 5.6 |

Note) Value in bracket means amount of metal-containing monomer dissolved mixture used

EXAMPLES 32 to 42
Comparative Example 7 to 13

Then, antifouling paints of the present invention (Examples 32 to 42) were prepared according to compounding ratios shown in Table 11, using the resin compositions P11 to P17. Further, antifouling paints of Comparative Examples 7 to 13 were prepared according to compounding ratios shown in Table 11, using the resin compositions P11, P15 and P17.

TABLE 11

| | Example | | | | | | | | | | | Comparative Example | | | | | | |
|---|---|---|---|---|---|---|---|---|---|---|---|---|---|---|---|---|---|---|
| | 32 | 33 | 34 | 35 | 36 | 37 | 38 | 39 | 40 | 41 | 42 | 7 | 8 | 9 | 10 | 11 | 12 | 13 |
| Comp. (C) | | | | | | | | | | | | | | | | | | |
| P11 | 40 | | | | | | | | | | | | | | | | | |
| P12 | | 40 | | | | | | | | | | | | | | | | |
| P13 | | | 40 | | | | | | | | | | | | | | | |
| P14 | | | | 40 | | | | | | | | | | | | | | |
| P15 | | | | | 40 | | | | | | | | | | | | | |
| P16 | | | | | | 40 | | | | | | | | | | | | |
| P11 | | | | | | | 40 | | | | | | | | | | | |
| P11 | | | | | | | | 40 | | | | | | | | | | |
| P17 | | | | | | | | | 40 | | | | | | | | | |
| P11 | | | | | | | | | | 40 | | | | | | | | |
| P11 | | | | | | | | | | | 40 | | | | | | | |
| P11 | | | | | | | | | | | | 40 | | | | | | |
| P15 | | | | | | | | | | | | | 40 | | | | | |
| P17 | | | | | | | | | | | | | | 36 | | | | |
| P11 | | | | | | | | | | | | | | | 40 | | | |
| P15 | | | | | | | | | | | | | | | | 40 | | |
| P17 | | | | | | | | | | | | | | | | | 36 | |
| P11 | | | | | | | | | | | | | | | | | | 40 |

TABLE 11-continued

|  | Example | | | | | | | | | | | Comparative Example | | | | | | |
| --- | --- | --- | --- | --- | --- | --- | --- | --- | --- | --- | --- | --- | --- | --- | --- | --- | --- | --- |
|  | 32 | 33 | 34 | 35 | 36 | 37 | 38 | 39 | 40 | 41 | 42 | 7 | 8 | 9 | 10 | 11 | 12 | 13 |
| Comp. (D) | | | | | | | | | | | | | | | | | | |
| n-propylmercaptan | | | | | 0.5 | | | | | | | | | | | | | |
| isobutylmercaptan | | | | | | 0.7 | | | | | | | | | | | | |
| n-octylmercaptan | | 0.4 | 0.9 | 1.2 | | | | | | | | | | | | | | |
| n-dodecylmercaptan | 1.3 | | | | | | | | 2.0 | 6.5 | 1.3 | | | | | | | |
| 2-mercapto-naphthalene | | | | | | | 1.0 | | | | | | | | | | | |
| 3-mercaptopropionic acid | | | | | | | | 0.7 | | | | | | | | | | |
| Component (E) (copper oxide) | 50 | 50 | 50 | 50 | 50 | 50 | 50 | 50 | 50 | 50 | 50 | 50 | 50 | 50 | | | | 50 |
| Copper rhodanate | | | | | | | | | | | | | | | 40 | 40 | 40 | |
| Zinc 2-pyridine-thiol-1-oxide | | | | | | | | | | | 3 | | | | | | | 3 |
| Iron oxide | 1.5 | 1.5 | 1.5 | 1.5 | 1.5 | 1.5 | 1.5 | 1.5 | 1.5 | 1.5 | 1.5 | 1.5 | 1.5 | 1.5 | | | | 1.5 |
| Titanium oxide | | | | | | | | | | | | | | | 10 | 10 | 10 | |
| Powdered silica | 3 | 3 | 3 | 3 | 3 | 3 | 3 | 3 | 3 | 3 | 3 | 3 | 3 | 3 | 3 | 3 | 3 | 3 |
| DISPERON 4200 | 1 | 1 | 1 | 1 | 1 | 1 | 1 | 1 | 1 | 1 | 1 | 1 | 1 | 1 | 1 | 1 | 1 | 1 |
| Xylene | 5 | 8 | 5 | 5 | 7 | 5 | 5 | 5 | 8 | 23 | 5 | 5 | 7 | 8 | 5 | 7 | 8 | 5 |
| ①: metal content in component (C) [m mol] | 14.9 | 17.6 | 14.1 | 10.6 | 19.5 | 15.6 | 14.9 | 14.9 | 20.8 | 14.9 | 14.9 | 14.9 | 19.5 | 20.8 | 14.9 | 19.5 | 20.8 | 14.9 |
| ②: amount of component (D) [mmol] | 6.4 | 2.7 | 6.2 | 8.2 | 6.6 | 7.8 | 6.2 | 6.6 | 9.9 | 32 | 6.4 | — | — | — | — | — | — | — |
| ②/① [fold] | 0.43 | 0.15 | 0.44 | 0.77 | 0.34 | 0.50 | 0.42 | 0.44 | 0.48 | 2.15 | 0.43 | 0 | 0 | 0 | 0 | 0 | 0 | 0 |

Note)
In example 41, xylene was added in 23-fold amount because paint viscosity at the beginning increases.
DISPERON 4200 (manufactured by Kusumoto Kasei, sagging inhibitor)

Then, using the above-prepared antifouling paints, tests were conducted in the same manner as mentioned above. (1) The results of storage stability test are shown in Table 12. (2) The results of wasting test are shown in Table 13. Further, 6 months after production of the paint, the paint was applied and tested, and the results are shown in Table 14. (3) The results of antifouling test are shown in Table 15. Further, 6 months after production of the paint, the paint was applied and tested, and the results are shown in Table 16. (4) The results of crack-resistance/peeling resistance test are shown in Table 17. Further, 6 months after production of the paint, the paint was applied and tested, and the results are shown in Table 18.

TABLE 12

| Paint viscosity | Example | | | | | | | | | | | Comparative Example | | | | | | |
| --- | --- | --- | --- | --- | --- | --- | --- | --- | --- | --- | --- | --- | --- | --- | --- | --- | --- | --- |
| (mPa · s) | 32 | 33 | 34 | 35 | 36 | 37 | 38 | 39 | 40 | 41 | 42 | 7 | 8 | 9 | 10 | 11 | 12 | 13 |
| Directly after paint production | 554 | 646 | 515 | 589 | 482 | 511 | 621 | 512 | 288 | 607 | 632 | 832 | 660 | 302 | 713 | 573 | 480 | 922 |
| After one month at 40° C. | 562 | 650 | 513 | 594 | 490 | 502 | 644 | 3502 | 4410 | 622 | 655 | 922 | 752 | 4820 | 705 | 581 | 471 | gelled |

Notice)
The painted films of about 240 μm disappeared utterly 21 months after in Example 34, 18 months after in Example 36 and 15 months after in Comparative Example 11.

TABLE 13

| | Example | | | | | | | | | | | Comparative Example | | | | | |
| --- | --- | --- | --- | --- | --- | --- | --- | --- | --- | --- | --- | --- | --- | --- | --- | --- | --- |
| | 32 | 33 | 34 | 35 | 36 | 37 | 38 | 39 | 40 | 41 | 42 | 7 | 8 | 9 | 10 | 11 | 12 |
| Wasted film thickness (μm) | | | | | | | | | | | | | | | | | |
| After 3 months | 17 | 32 | 38 | 15 | 52 | 30 | 14 | 19 | 30 | 16 | 15 | 5 | 15 | 13 | 16 | 50 | 29 |
| After 6 months | 31 | 59 | 72 | 27 | 99 | 57 | 27 | 29 | 45 | 32 | 28 | 9 | 28 | 17 | 33 | 102 | 48 |
| After 9 months | 46 | 87 | 107 | 37 | 144 | 84 | 40 | 38 | 55 | 49 | 42 | 14 | 41 | 18 | 49 | 151 | 60 |
| After 12 months | 60 | 115 | 142 | 48 | 191 | 110 | 54 | 47 | 63 | 66 | 56 | 19 | 55 | 18 | 65 | 205 | 69 |

TABLE 13-continued

| | Example | | | | | | | | | | | Comparative Example | | | | | |
|---|---|---|---|---|---|---|---|---|---|---|---|---|---|---|---|---|---|
| | 32 | 33 | 34 | 35 | 36 | 37 | 38 | 39 | 40 | 41 | 42 | 7 | 8 | 9 | 10 | 11 | 12 |
| After 15 months | 75 | 144 | 176 | 57 | 235 | 136 | 69 | 54 | 68 | 82 | 69 | 23 | 68 | 18 | 82 | — | 75 |
| After 18 months | 90 | 172 | 211 | 68 | — | 162 | 83 | 62 | 71 | 98 | 84 | 28 | 82 | 18 | 99 | — | 78 |
| After 21 months | 104 | 200 | — | 78 | — | 188 | 96 | 70 | 71 | 114 | 97 | 33 | 95 | 18 | 115 | — | 79 |
| After 24 months | 119 | 227 | — | 87 | — | 214 | 110 | 78 | 71 | 129 | 109 | 37 | 111 | 18 | 131 | — | 79 |
| Monthly average wasted film thickness ($\mu$m) | 5.0 | 9.5 | 11.7 | 3.6 | 15.7 | 8.9 | 4.6 | 3.2 | 3.0 | 5.4 | 4.5 | 1.5 | 4.6 | 0.8 | 5.5 | 17.1 | 3.3 |

Notice)
The painted films of about 240 $\mu$m disappeared utterly 21 months after in Example 34, 18 months after in Example 36 and 15 months after in Comparative Example 11.

TABLE 14

| | Example | | | | | | | | | | | Comparative Example | | | | | |
|---|---|---|---|---|---|---|---|---|---|---|---|---|---|---|---|---|---|
| | 32 | 33 | 34 | 35 | 36 | 37 | 38 | 39 | 40 | 41 | 42 | 7 | 8 | 9 | 10 | 11 | 12 |
| Wasted film thickness ($\mu$m) | | | | | | | | | | | | | | | | | |
| After 3 months | 15 | 28 | 40 | 17 | 50 | 28 | 13 | 9 | 31 | 16 | 14 | 4 | 6 | 10 | 19 | 56 | 30 |
| After 6 months | 29 | 55 | 75 | 29 | 96 | 54 | 27 | 19 | 44 | 31 | 27 | 7 | 10 | 10 | 35 | 104 | 47 |
| After 9 months | 44 | 81 | 109 | 41 | 141 | 81 | 41 | 27 | 52 | 46 | 41 | 10 | 15 | 10 | 42 | 153 | 62 |
| After 12 months | 59 | 108 | 144 | 52 | 185 | 107 | 54 | 35 | 58 | 60 | 55 | 12 | 19 | 10 | 59 | 203 | 71 |
| After 15 months | 73 | 135 | 177 | 62 | 230 | 132 | 67 | 44 | 61 | 75 | 68 | 15 | 24 | 10 | 75 | — | 76 |
| After 18 months | 87 | 162 | 212 | 73 | — | 159 | 81 | 52 | 63 | 91 | 81 | 18 | 30 | 10 | 92 | — | 76 |
| After 21 months | 101 | 190 | — | 84 | — | 185 | 94 | 61 | 64 | 105 | 95 | 20 | 34 | 10 | 109 | — | 77 |
| After 24 months | 115 | 217 | — | 95 | — | 210 | 107 | 69 | 64 | 119 | 108 | 22 | 38 | 10 | 126 | — | 77 |
| Monthly average wasted film thickness ($\mu$m) | 4.8 | 9.0 | 11.8 | 4.0 | 15.3 | 8.8 | 4.5 | 2.9 | 2.7 | 5.0 | 4.5 | 0.9 | 1.6 | 0.4 | 5.3 | 16.9 | 3.2 |

Notice)
The painted films of about 240 $\mu$m disappeared utterly 21 months after in Example 34, 18 months after in Example 36 and 15 months after in Comparative Example 11.

TABLE 15

| | Example | | | | | | | | | | | Comparative Example | | | | | |
|---|---|---|---|---|---|---|---|---|---|---|---|---|---|---|---|---|---|
| | 32 | 33 | 34 | 35 | 36 | 37 | 38 | 39 | 40 | 41 | 42 | 7 | 8 | 9 | 10 | 11 | 12 |
| Adhered area (%) | | | | | | | | | | | | | | | | | |
| After 6 months | 0 | 0 | 0 | 0 | 0 | 0 | 0 | 0 | 0 | 0 | 0 | 0 | 0 | 0 | 50 | 30 | 50 |
| After 12 months | 0 | 0 | 0 | 0 | 0 | 0 | 0 | 0 | 0 | 0 | 0 | 0 | 0 | 0 | 100 | 70 | 100 |
| After 18 months | 0 | 0 | 0 | 0 | 0 | 0 | 0 | 0 | 0 | 0 | 0 | 0 | 0 | 30 | 100 | 100 | 100 |
| After 24 months | 0 | 0 | 0 | 0 | 0 | 0 | 0 | 0 | 0 | 0 | 0 | 10 | 0 | 70 | 100 | 100 | 100 |
| After 30 months | 0 | 0 | 0 | 0 | 0 | 0 | 0 | 0 | 30 | 0 | 0 | 50 | 10 | 100 | 100 | 100 | 100 |
| After 36 months | 0 | 0 | 0 | 0 | 0 | 0 | 0 | 10 | 70 | 0 | 0 | 80 | 50 | 100 | 100 | 100 | 100 |

TABLE 16

| | Example | | | | | | | | | | | Comparative Examples | | | | | |
|---|---|---|---|---|---|---|---|---|---|---|---|---|---|---|---|---|---|
| | 32 | 33 | 34 | 35 | 36 | 37 | 38 | 39 | 40 | 41 | 42 | 7 | 8 | 9 | 10 | 11 | 12 |
| Adhered area (%) | | | | | | | | | | | | | | | | | |
| After 6 months | 0 | 0 | 0 | 0 | 0 | 0 | 0 | 0 | 0 | 0 | 0 | 0 | 0 | 0 | 50 | 30 | 50 |
| After 12 months | 0 | 0 | 0 | 0 | 0 | 0 | 0 | 0 | 0 | 0 | 0 | 30 | 0 | 0 | 100 | 70 | 100 |
| After 18 months | 0 | 0 | 0 | 0 | 0 | 0 | 0 | 0 | 0 | 0 | 0 | 70 | 0 | 30 | 100 | 100 | 100 |
| After 24 months | 0 | 0 | 0 | 0 | 0 | 0 | 0 | 0 | 0 | 0 | 0 | 100 | 30 | 70 | 100 | 100 | 100 |
| After 30 months | 0 | 0 | 0 | 0 | 0 | 0 | 0 | 0 | 30 | 0 | 0 | 100 | 50 | 100 | 100 | 100 | 100 |
| After 36 months | 0 | 0 | 0 | 0 | 0 | 0 | 0 | 30 | 70 | 0 | 0 | 100 | 100 | 100 | 100 | 100 | 100 |

TABLE 17

|  | Example | | | | | | | | | | | Comparative Example | | | | | |
|---|---|---|---|---|---|---|---|---|---|---|---|---|---|---|---|---|---|
|  | 32 | 33 | 34 | 35 | 36 | 37 | 38 | 39 | 40 | 41 | 42 | 7 | 8 | 9 | 10 | 11 | 12 |
| Crack-resistance/peeling-resistance | | | | | | | | | | | | | | | | | |
| After 6 months | | | | | | | | | | | | | | | | | |
| A | ○ | ○ | ○ | ○ | ○ | ○ | ○ | ○ | ○ | ○ | ○ | ○ | ○ | ○ | ○ | ○ | ○ |
| B | ○ | ○ | ○ | ○ | ○ | ○ | ○ | ○ | ○ | ○ | ○ | ○ | ○ | ○ | ○ | ○ | ○ |
| After 12 months | | | | | | | | | | | | | | | | | |
| A | ○ | ○ | ○ | ○ | ○ | ○ | ○ | ○ | ○ | ○ | ○ | ○ | ○ | ○ | ○ | ○ | ○ |
| B | ○ | ○ | ○ | ○ | ○ | ○ | ○ | ○ | ○ | ○ | ○ | ○ | ○ | ○ | Δ | ○ | ○ |
| After 18 months | | | | | | | | | | | | | | | | | |
| A | ○ | ○ | ○ | ○ | ○ | ○ | ○ | ○ | ○ | Δ | ○ | ○ | ○ | ○ | Δ | ○ | ○ |
| B | ○ | ○ | ○ | ○ | ○ | ○ | ○ | Δ | ○ | Δ | Δ | ○ | ○ | ○ | X | ○ | ○ |
| After 24 months | | | | | | | | | | | | | | | | | |
| A | ○ | ○ | ○ | ○ | ○ | ○ | Δ | ○ | Δ | Δ | ○ | ○ | ○ | ○ | X | ○ | ○ |
| B | ○ | ○ | ○ | ○ | ○ | ○ | Δ | ○ | Δ | Δ | ○ | ○ | ○ | ○ | X | ○ | ○ |

TABLE 18

|  | Example | | | | | | | | | | | Comparative Example | | | | | |
|---|---|---|---|---|---|---|---|---|---|---|---|---|---|---|---|---|---|
|  | 32 | 33 | 34 | 35 | 36 | 37 | 38 | 39 | 40 | 41 | 42 | 7 | 8 | 9 | 10 | 11 | 12 |
| Crack-resistance/peeling-resistance | | | | | | | | | | | | | | | | | |
| After 6 months | | | | | | | | | | | | | | | | | |
| A | ○ | ○ | ○ | ○ | ○ | ○ | ○ | ○ | ○ | ○ | ○ | ○ | ○ | ○ | ○ | ○ | ○ |
| B | ○ | ○ | ○ | ○ | ○ | ○ | ○ | ○ | ○ | ○ | ○ | ○ | ○ | ○ | ○ | ○ | ○ |
| B | ○ | ○ | ○ | ○ | ○ | ○ | ○ | ○ | ○ | ○ | ○ | ○ | ○ | ○ | Δ | ○ | ○ |
| After 18 months | | | | | | | | | | | | | | | | | |
| A | ○ | ○ | ○ | ○ | ○ | ○ | ○ | ○ | ○ | Δ | ○ | ○ | ○ | ○ | Δ | ○ | ○ |
| B | ○ | ○ | ○ | ○ | ○ | ○ | ○ | Δ | ○ | Δ | Δ | ○ | ○ | ○ | X | ○ | ○ |
| After 24 months | | | | | | | | | | | | | | | | | |
| A | ○ | ○ | ○ | ○ | ○ | ○ | Δ | ○ | Δ | Δ | ○ | ○ | ○ | ○ | X | ○ | ○ |
| B | ○ | ○ | ○ | ○ | ○ | ○ | Δ | ○ | Δ | Δ | ○ | ○ | ○ | ○ | X | ○ | ○ |

In Comparative Examples 7 to 9 using no component (D), tests of painting 6 months after revealed a tendency of significant reduction in self polishing property of a painted film and also of decrease in antifouling effect over a long period, as compared with tests of painting two weeks after production of the paint. In Comparative Example 13, storage stability was low and the sample was gelled during evaluation.

In Comparative Examples 10 to 12 using no component (E) (copper oxide), some samples showed high self polishing property, however, anti fouling effect for a long period was not found.

On the other hand, in Examples 32 to 42, as a result of tests of painting two weeks after production of a paint and tests of painting six months after, self polishing properties were approximately equivalent, and decrease in antifouling effect over a long period of time was not found. Even when copper oxide was used, the approximately the same hydrolyzing property as in the case of no use of copper oxide was found.

As described above, according to the present invention, a metal-containing monomer dissolved mixture can be provided which is dissolved in a general organic solvent, excellent in storage stability, and excellent in mixing property with a general acrylic monomer; and a metal-containing resin can be provided wherein the polymer obtained by using the mixture as a raw material is dissolvable in a general organic solvent.

An antifouling paint composition using a polymer herein obtained manifests excellent antifouling effects such as uniform dissolution in sea water at appropriate speed and maintenance of self polishing property for a long period of time, and has excellent cracking-resistance and peeling-resistance.

Further, the antifouling paint composition of the present invention can maintain excellent antifouling effect for a long period without manifesting significant reduction in self polishing property of a film formed, even after a long period of time passed after production.

What is claimed is:

1. A metal-containing monomer dissolved mixture comprising a reaction product of an inorganic metal compound with a carboxyl group-containing radical polymerizable monomer, an organic solvent including at least an alcohol-based solvent, and added water, wherein the amount of water is from 0.01 to 30% by weight.

2. The metal-containing monomer dissolved mixture according to claim 1 wherein water is contained in a proportion of 0.01 to 5-fold based on the mol number of the inorganic metal compound.

3. The metal-containing monomer dissolved mixture according to claim 1 wherein the ratio of the alcohol-based solvent in the organic solvent is from 5 to 100% by weight.

4. The metal-containing monomer dissolved mixture according to claim 1 comprising a reaction product of an oxide, hydroxide or chloride of a metal composed of zinc, copper or magnesium with (meth) acrylic acid, an organic solvent including at least an alcohol-based solvent and water, wherein water is contained in a proportion of 0.05 to 3-fold based on the mol number of the oxide, hydroxide or chloride of a metal composed of zinc, copper or magnesium.

5. A metal-containing resin obtained by copolymerizing the metal-containing monomer in the mixture of claim 1 with a radical-polymerizable unsaturated monomer.

6. An antifouling paint composition obtained by using the metal-containing resin of claim 5.

7. The antifouling paint composition according to claim 6 wherein the weight-average molecular weight of the metal-containing resin is from 1000 to 20000.

8. An antifouling paint composition comprising a divalent metal-containing resin, a compound of the following general formula (I), and copper oxide:

wherein $R^1$ represents an organic group having 1 to 30 carbon atoms.

9. The antifouling paint composition according to claim 8 wherein the divalent metal-containing resin contains at least one metal selected from copper, zinc and magnesium.

10. The antifouling paint composition according to claim 8 wherein the divalent metal-containing resin is a copolymer of a metal-containing monomer.

11. The antifouling paint composition according to claim 10 wherein a polymerizable compound having two unsaturated groups and/or a compound of the following general formula (II) is used, as the metal-containing monomer:

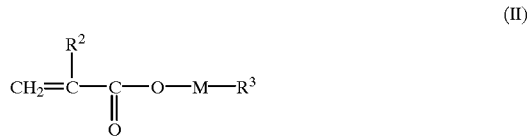

wherein $R^2$ represents a hydrogen atom or methyl group, M represents Mg, Zn or Cu, $R^3$ represents an organic acid residue.

12. The antifouling paint composition according to claim 8 wherein the divalent metal-containing resin is a resin obtained by using a metal-containing monomer dissolved mixture comprising a reaction product of an inorganic metal compound with a carboxyl group-containing radical polymerizable monomer, an organic solvent including at least an alcohol-based solvent, and added water, wherein the amount of water is from 0.01 to 30% by weight.

13. The antifouling paint composition according to claim 12 wherein the ratio of an alcohol-based solvent in the organic solvent is from 5 to 100% by weight.

14. The antifouling paint composition according to claim 8 wherein the content of the compound of the general formula (I) is from 0.01 to 0.99-fold based on the metal content (mol number) in the divalent metal-containing resin.

* * * * *